(12) United States Patent
Heidari-Bateni et al.

(10) Patent No.: US 7,353,516 B2
(45) Date of Patent: Apr. 1, 2008

(54) DATA FLOW CONTROL FOR ADAPTIVE INTEGRATED CIRCUITRY

(75) Inventors: Ghobad Heidari-Bateni, San Diego, CA (US); Sharad D. Sambhwani, San Diego, CA (US)

(73) Assignee: NVIDIA Corporation, Santa Clara, CA (US)

( * ) Notice: Subject to any disclaimer, the term of this patent is extended or adjusted under 35 U.S.C. 154(b) by 943 days.

(21) Appl. No.: 10/641,976

(22) Filed: Aug. 14, 2003

(65) Prior Publication Data

US 2005/0039185 A1   Feb. 17, 2005

(51) Int. Cl.
- G06F 9/46 (2006.01)
- G06F 9/40 (2006.01)
- G06F 9/44 (2006.01)

(52) U.S. Cl. ............... 718/102; 712/200; 712/201; 712/220; 712/221

(58) Field of Classification Search ........ 718/100–108; 712/200–201, 220–221

See application file for complete search history.

(56) References Cited

U.S. PATENT DOCUMENTS

| | | | |
|---|---|---|---|
| 5,099,418 A * | 3/1992 | Pian et al. ............... | 718/102 |
| 6,128,307 A * | 10/2000 | Brown ..................... | 370/412 |
| 6,353,841 B1 * | 3/2002 | Marshall et al. ........... | 708/232 |
| 6,836,839 B2 * | 12/2004 | Master et al. ............. | 712/29 |
| 2003/0154357 A1 * | 8/2003 | Master et al. ............. | 712/15 |
| 2004/0003019 A1 * | 1/2004 | Ali-Santosa et al. ....... | 709/100 |
| 2004/0025159 A1 * | 2/2004 | Scheuermann et al. ..... | 718/100 |
| 2005/0044344 A1 * | 2/2005 | Stevens .................... | 712/227 |

* cited by examiner

*Primary Examiner*—Meng-Al T. An
*Assistant Examiner*—Jennifer N. To
(74) *Attorney, Agent, or Firm*—Patterson & Sheridan, L.L.P.

(57) ABSTRACT

The present invention concerns data flow control in adaptive integrated circuitry which utilizes a data flow model for data processing. The present invention controls task initiation and execution based upon data consumption measured in data buffer units. In the various embodiments, when a first task of a plurality of tasks is initiated, buffer parameter is determined and a buffer count is initialized for the first task. For each iteration of the first task using a data buffer unit of input data, the buffer count is correspondingly adjusted, such as incremented or decremented. When the buffer count meets the buffer parameter requirements, the state of the first task is changed, which may including stopping the first task, and a next action is determined, such as initiating a second task. The various apparatus embodiments include a hardware task manager, a node sequencer, a programmable node, and use of a monitoring task within an adaptive execution unit.

20 Claims, 26 Drawing Sheets

ADAPTIVE COMPUTING ENGINE (ACE)

DATA FLOW CONTROL FOR ADAPTIVE INTEGRATED CIRCUITRY

CROSS-REFERENCE TO A RELATED APPLICATION

This application is related to a Paul L. Master et al., U.S. patent application Ser. No. 10/384,486, entitled "Adaptive Integrated Circuitry With Heterogeneous And Reconfigurable Matrices Of Diverse And Adaptive Computational Units Having Fixed, Application Specific Computational Elements", filed Mar. 7, 2003, commonly assigned to QuickSilver Technology, Inc., and incorporated by reference herein, with priority claimed for all commonly disclosed subject matter (the "related application"), which is a continuation-in-part of Paul L. Master et al., U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001, commonly assigned to QuickSilver Technology, Inc.

FIELD OF THE INVENTION

The present invention relates, in general, to data flow control in integrated circuits and, more particularly, to data flow control in adaptive integrated circuitry with heterogeneous and reconfigurable matrices of diverse and adaptive computational units having fixed, application specific computational elements.

BACKGROUND OF THE INVENTION

The related application discloses a new form or type of integrated circuit, referred to as an adaptive computing engine ("ACE"), which is readily reconfigurable, in real time, and is capable of having corresponding, multiple modes of operation.

The ACE architecture for adaptive or reconfigurable computing, includes a plurality of different or heterogeneous computational elements coupled to an interconnection network. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real time to adapt (configure and reconfigure) the plurality of heterogeneous computational elements for a plurality of different functional modes, including linear algorithmic operations, non-linear algorithmic operations, finite state machine operations, memory operations, and bit-level manipulations.

The ACE architecture utilizes a data flow model for processing. More particularly, input operand data will be processed to produce output data (without other intervention such as interrupt signals, instruction fetching, etc.), whenever the input data is available and an output port (register or buffer) is available for any resulting output data. Controlling the data flow processing to implement an algorithm, however, presents unusual difficulties, such as the communication and control algorithms used in wideband CDMA ("WCDMA") and cdma2000.

More particularly, many algorithms are not designed for processing using a data flow model such as that employed in the ACE architecture. Rather than being executed in a data flow-based system which executes when the data and output ports are available, many such algorithms are designed for implementation using systems having other, specific forms of processing control. For example, digital signal processor ("DSP") implementations may provide control over processing using program instructions and interrupt signals over many clock cycles, while application specific integrated circuits ("ASICs") may implement the algorithm directly in the fixed circuit layout, also for execution over many clock cycles.

This data flow model for processing, while invaluable for efficiency and other considerations, creates data flow control concerns which should be addressed in the adaptive computing architecture. These concerns, among others, include when processing of input data should begin for a given task, when processing of input data should end for the given task, and how these determinations should be made. In addition, the ACE architecture should provide for control over processing of multiple tasks, such as tasks (e.g., exception tasks) which may occur intermittently during performance of another task (e.g., a normal or regular task).

SUMMARY OF THE INVENTION

The present invention provides processing control in an adaptive computing architecture which utilizes a data flow model for data processing. The present invention provides control over when processing of input data should begin for a given task or operation, when processing of input data should end for the given task or operation, and controls how these determinations are made. The present invention also provides for a plurality of implementations of a control flow methodology in the ACE architecture, including within a programmable node, a monitoring task, a hardware task manager, and a nodal sequencer.

In a method for providing data flow control of the present invention, the method includes: (a) when a first task of a plurality of tasks is initiated, determining a buffer parameter; (b) initializing a buffer count for the first task; (c) for each iteration of the first task using a data buffer unit of input data, correspondingly adjusting the buffer count; (d) when the buffer count meets the buffer parameter requirements, changing the state of the first task and determining a next action.

A first apparatus embodiment of the present invention includes an adaptive execution unit capable of executing a first task and a second task of a plurality of tasks; and a hardware task manager coupled to the adaptive execution unit, the hardware task manager capable of initiating the first task for execution by the adaptive execution unit, determining a buffer parameter for the first task; initializing a buffer count for the first task; for each iteration of the first task by the adaptive execution unit using a data buffer unit of input data, correspondingly adjusting the buffer count; and when the buffer count meets the buffer parameter requirements, changing the state of the first task and determining a next action.

A second apparatus embodiment of the present invention includes: a reconfigurable node capable of executing a first task and a second task of a plurality of tasks; and a programmable node coupled to the reconfigurable node, the programmable node capable of initiating the first task, determining a buffer parameter for the first task; initializing a buffer count for the first task; for each iteration of the first task by the reconfigurable node using a data buffer unit of input data, correspondingly adjusting the buffer count; and when the buffer count meets the buffer parameter requirements, changing the state of the first task and determining a next action.

A third apparatus embodiment of the present invention includes: an adaptive execution unit capable of executing a first task and a second task of a plurality of tasks, the adaptive execution unit further capable of executing a monitoring task; and a hardware task manager coupled to the adaptive execution unit, the hardware task manager capable of initiating the first task for execution by the adaptive execution unit; wherein the monitoring task is capable of determining a buffer parameter for the first task; initializing a buffer count for the first task; for each iteration of the first task by the adaptive execution unit using a data buffer unit of input data, correspondingly adjusting the buffer count; and when the buffer count meets the buffer parameter requirements, changing the state of the first task and determining a next action.

A fourth apparatus embodiment of the present invention includes: a plurality of computational elements, wherein a first computational element of the plurality of computational elements has a first fixed architecture and a second computational element of the plurality of computational elements has a second fixed architecture, the first fixed architecture being different from the second fixed architecture; an interconnection network coupled to the plurality of computational elements, the interconnection network capable of configuring the plurality of computational elements for performance of a first task of a plurality of tasks in response to first configuration information, and the interconnection network further capable of reconfiguring the plurality of computational elements for performance of a second task of the plurality of tasks in response to second configuration information, the first task being different than the second task; and a node sequencer coupled to the interconnection network, the node sequencer capable of initiating the first task for execution by the adaptive execution unit, determining a buffer parameter for the first task; initializing a buffer count for the first task; for each iteration of the first task by the adaptive execution unit using a data buffer unit of input data, correspondingly adjusting the buffer count; and when the buffer count meets the buffer parameter requirements, changing the state of the first task and determining a next action.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
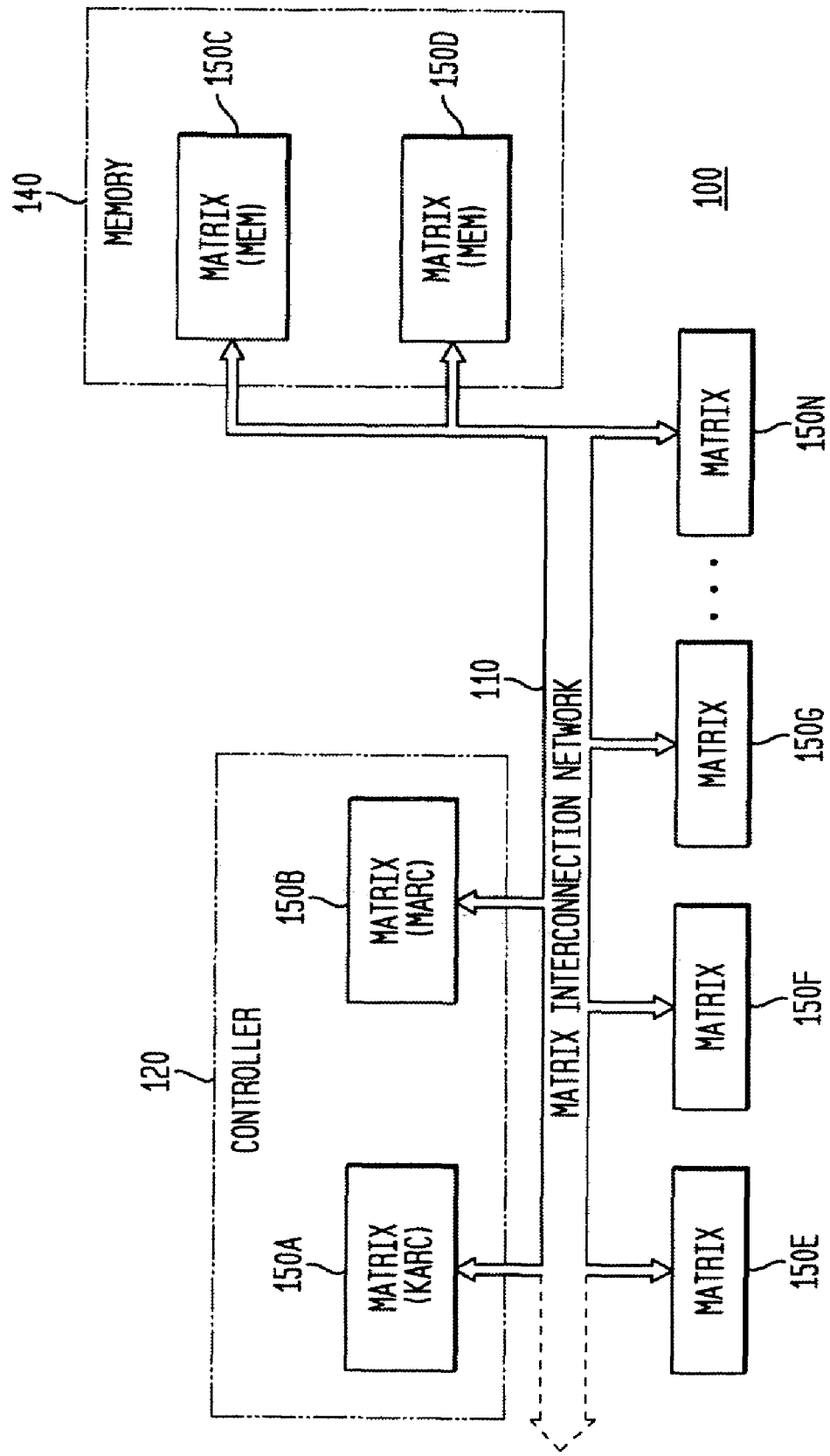
FIG. 1 is a block diagram illustrating an exemplary first apparatus embodiment in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

The present invention provides processing control in an adaptive computing architecture which utilizes a data flow model for data processing. The present invention provides control over when processing of input data should begin for a given task or operation, when processing of input data should end for the given task or operation, and controls how these determinations are made. In addition, the present invention provides for control over processing of multiple tasks or operations, such as "exception" tasks which may occur intermittently during performance of another "normal" or regular task. As discussed in greater detail below, the present invention also provides for a plurality of implementations of a control flow methodology in the ACE architecture, including within a programmable node, a monitoring task, a hardware task manager, and a nodal sequencer.

FIG. 1 is a block diagram illustrating a first apparatus 100 embodiment in accordance with the present invention. The apparatus 100, referred to herein as an adaptive computing engine ("ACE") 100, is preferably embodied as an integrated circuit, or as a portion of an integrated circuit having other, additional components. In the first apparatus embodiment, and as discussed in greater detail below, the ACE 100 includes one or more reconfigurable matrices (or nodes) 150, such as matrices 150A through 150N as illustrated, and a matrix interconnection network 110. Also in the first apparatus embodiment, and as discussed in detail below, one or more of the matrices (nodes) 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes.

A significant departure from the prior art, the ACE 100 does not utilize traditional (and typically separate) data, direct memory access (DMA), random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real time, to provide any given connection between and among the reconfigurable matrices 150, including those matrices 150 configured as the controller 120 and the memory 140, as discussed in greater detail below.

The matrices 150 configured to function as memory 140 may be implemented in any desired or preferred way, utilizing computational elements (discussed below) of fixed memory elements, and may be included within the ACE 100 or incorporated within another IC or portion of an IC. In the first apparatus embodiment, the memory 140 is included within the ACE 100, and preferably is comprised of computational elements which are low power consumption random access memory (RAM), but also may be comprised of computational elements of any other form of memory, such as flash, DRAM, SRAM, SDRAM, FeRAM, MRAM, ROM, EPROM or E$^2$PROM. In the first apparatus embodiment, the memory 140 preferably includes DMA engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the exemplary form of combined data, configuration and control information referred to herein as a "silverware" module. The kernel controller is also referred to as a "K-node", discussed in greater detail below with reference to FIGS. 10 and 11.

Figure 3:
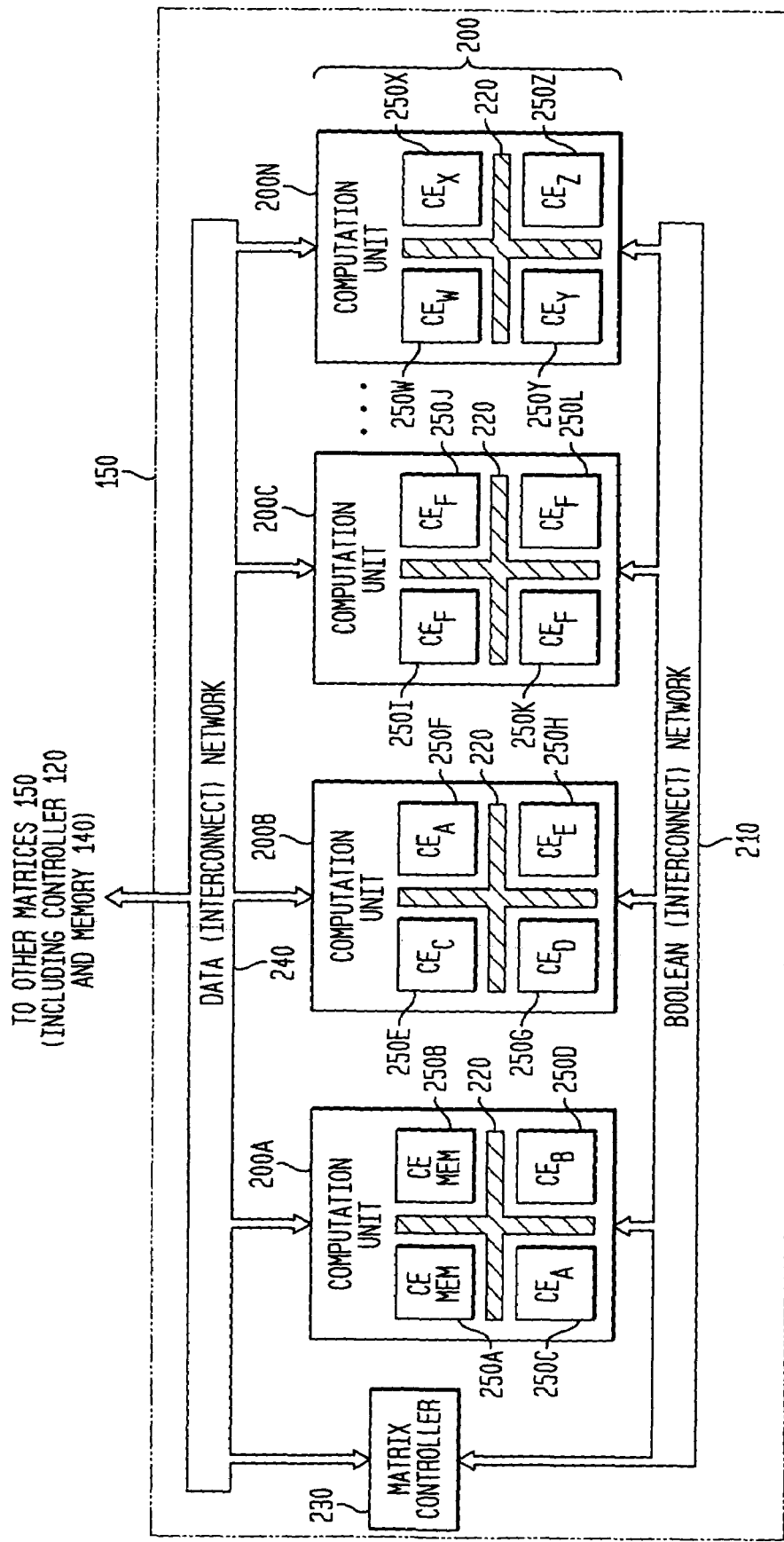
FIG. 3 is a block diagram illustrating a reconfigurable matrix (or node), a plurality of computation units, and a plurality of computational elements.
Figure 4:
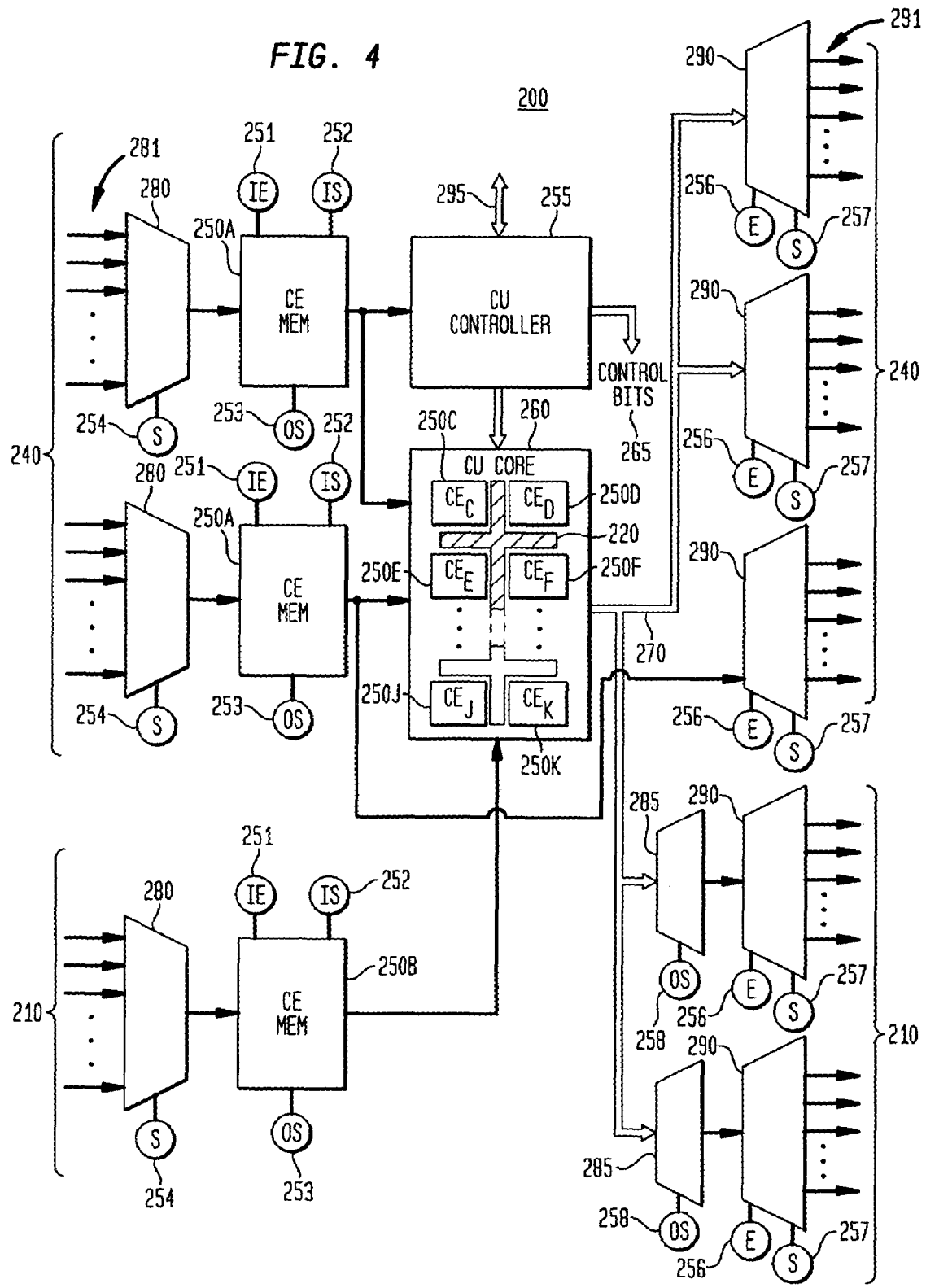
FIG. 4 is a block diagram illustrating, in greater detail, a computational unit of a reconfigurable matrix.

The matrix interconnection network ("MIN") 110 of FIG. 1, and its subset interconnection networks separately illustrated in FIGS. 3 and 4 (Boolean interconnection network 210, data interconnection network 240, and interconnect 220), collectively and generally referred to herein as "interconnect", "interconnection(s)" or "interconnection network(s)", may be implemented generally as known in the art, such as utilizing FPGA interconnection networks or switching fabrics, albeit in a considerably more varied fashion. In the first apparatus embodiment, the various interconnection networks are implemented as described, for example, in U.S. Pat. Nos. 5,218,240, 5,336,950, 5,245,227, and 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses. In the second apparatus embodiment, the various interconnection networks are implemented as described below with reference to FIGS. 12 and 13, using various combinations of routing elements, such as token rings or arbiters, and multiplexers, at varying levels within the system and apparatus embodiments.

It should be pointed out, however, that while any given level of switching or selecting operation of or within the various interconnection networks (110, 210, 240 and 220) may be implemented as known in the art, the combinations of routing elements and multiplexing elements, the use of different routing elements and multiplexing elements at differing levels within the system, and the design and layout of the various interconnection networks (110, 210, 240 and 220) are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 3 and 4, which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture and provide a useful explanatory basis for the real time operation of the ACE 100 and its inherent advantages.

The first novel concepts concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 3) of the matrices 150, such as pluralities of multipliers, complex multipliers, and adders, each of which are designed for optimal execution of corresponding multiplication, complex multiplication, and addition functions. Given that the ACE 100 is to be optimized, in the first apparatus embodiment, for low power consumption, the functions for acceleration are selected based upon power consumption. For example, for a given application such as mobile communication, corresponding C(C# or C++) or other code may be analyzed for power consumption. Such empirical analysis may reveal, for example, that a small portion of such code, such as 10%, actually consumes 90% of the operating power when executed. On the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 3, other functionality, such as control code, may be accelerated within matrices 150 when configured as finite state machines.

Figure 2:
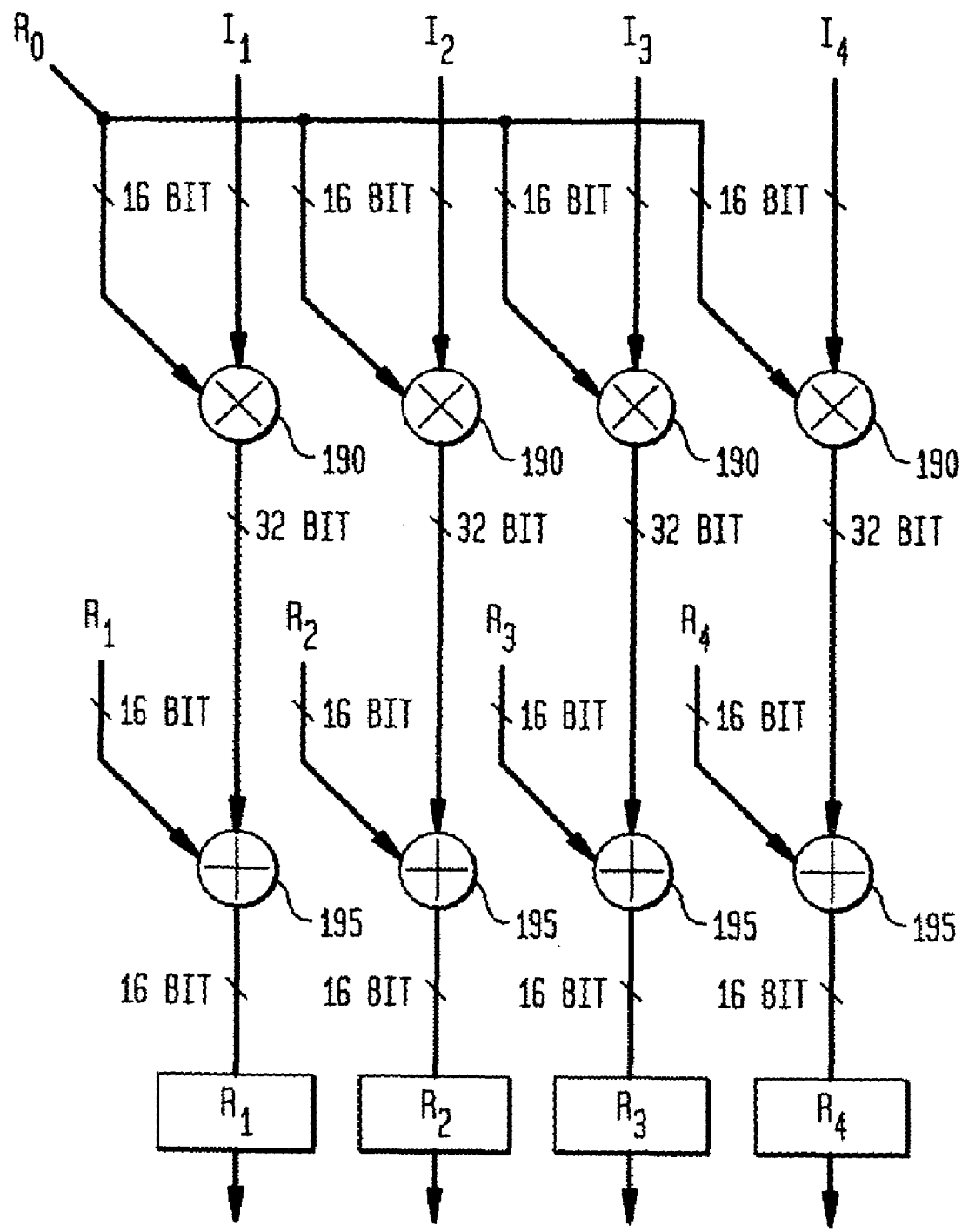
FIG. 2 is a schematic diagram illustrating an exemplary data flow graph in accordance with the present invention.

Next, algorithms or other functions selected for acceleration are converted into a form referred to as a "data flow graph" ("DFG"). A schematic diagram of an exemplary data flow graph, in accordance with the present invention, is illustrated in FIG. 2. As illustrated in FIG. 2, an algorithm or function useful for CDMA voice coding (QCELP (Qualcomm code excited linear prediction) is implemented utilizing four multipliers 190 followed by four adders 195. Through the varying levels of interconnect, the algorithms of this data flow graph are then implemented, at any given time, through the configuration and reconfiguration of fixed computational elements (250), namely, implemented within hardware which has been optimized and configured for efficiency, i.e., a "machine" is configured in real time which is optimized to perform the particular algorithm. Continuing with the exemplary DFG or FIG. 2, four fixed or dedicated multipliers, as computational elements 250, and four fixed or dedicated adders, also as different computational elements 250, are configured in real time through the interconnect to perform the functions or algorithms of the particular DFG. Using this data flow model, data which is produced, such as by the multipliers 190, is immediately consumed, such as by adders 195.

The third and perhaps most significant concept, and a marked departure from the concepts and precepts of the prior art, is the concept of reconfigurable "heterogeneity" utilized to implement the various selected algorithms mentioned above. As indicated above, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, within computation units 200, different computational elements (250) are implemented directly as correspondingly different fixed (or dedicated) application specific hardware, such as dedicated multipliers, complex multipliers, accumulators, arithmetic logic units (ALUs), registers, and adders. Utilizing interconnect (210 and 220), these differing, heterogeneous computational elements (250) may then be adaptively configured, in real time, to perform the selected algorithm, such as the performance of discrete cosine transformations often utilized in mobile communications. For the data flow graph example of FIG. 2, four multipliers and four adders will be configured, i.e., connected in real time, to perform the particular algorithm. As a consequence, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm. At another instant in time, the configuration may be changed, to interconnect other computational elements (250) or connect the same computational elements 250 differently, for the performance of another function or algorithm. Two important features arise from this temporal reconfigurability. First, as algorithms may change over time to, for example, implement a new technology standard, the ACE 100 may co-evolve and be reconfigured to implement the new algorithm. For a simplified example, a fifth multiplier and a fifth adder may be incorporated into the DFG of FIG. 2 to execute a correspondingly new algorithm, with additional interconnect also potentially utilized to implement any additional bussing functionality. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between adaptation (configuration and reconfiguration), on the one hand, and programming or reprogrammability, on the other hand. Typical programmability utilizes a pre-existing group or set of functions, which may be called in various orders, over time, to implement a particular algorithm. In contrast, configurability and reconfigurability (or adaptation), as used herein, includes the additional capability of adding or creating new functions which were previously unavailable or non-existent.

Next, the ACE 100 also utilizes a tight coupling (or interdigitation) of data and configuration (or other control) information, within one, effectively continuous stream of information. This coupling or commingling of data and configuration information, referred to as a "silverware" module, is the subject of a separate, related patent application. For purposes of the present invention, however, it is sufficient to note that this coupling of data and configuration information into one information (or bit) stream helps to enable real time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements 250 has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. The immediacy of the data, for use in the configured computational elements 250, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real time reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

Referring again to FIG. 1, the functions of the controller 120 (preferably matrix (KARC) 150A and matrix (MARC) 150B, configured as finite state machines) may be explained: (1) with reference to a silverware module, namely, the tight coupling of data and configuration information within a single stream of information; (2) with reference to multiple potential modes of operation; (3) with reference to the reconfigurable matrices 150; and (4) with reference to the reconfigurable computation units 200 and the computational elements 150 illustrated in FIG. 3. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the first apparatus embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the first apparatus embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100. Additional functions of the kernel controller, as a K-node, are discussed in greater detail below.

Continuing to refer to FIG. 1, the matrix (MARC) 150B manages the scheduling of matrix 150 resources and the timing of any corresponding data, to synchronize any configuration or reconfiguration of the various computational elements 250 and computation units 200 with any corresponding input data and output data. In the first apparatus embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150. This matrix control functionality may also be combined with kernel control, such as in the K-node, discussed below.

FIG. 3 is a block diagram illustrating, in greater detail, a reconfigurable matrix (or node) 150 with a plurality of computation units 200 (illustrated as computation units 200A through 200N), and a plurality of computational elements 250 (illustrated as computational elements 250A through 250Z), and provides additional illustration of the exemplary types of computational elements 250 and a useful summary. As illustrated in FIG. 3, any matrix 150 generally includes a matrix controller 230, a plurality of computation (or computational) units 200, and as logical or conceptual subsets or portions of the matrix interconnect network 110, a data interconnect network 240 and a Boolean interconnect network 210. The matrix controller 230 may also be implemented as a hardware task manager, discussed below with reference to FIG. 10. As mentioned above, in the first apparatus embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality. It should also be noted that other, exemplary forms of interconnect are discussed in greater detail below with reference to FIGS. 11-13.

Continuing to refer to FIG. 3, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the quadruple multiplications and additions of the DFG of FIG. 2, utilizing the interconnect 220, the Boolean network 210, and the matrix interconnection network 110. For example, using the multiplexing or routing capabilities discussed below, the inputs/outputs of a computational element 250 may be coupled to outputs/inputs of a first set of (other) computational elements 250, for performance of a first function or algorithm, and subsequently adapted or reconfigured, such that these inputs/outputs are coupled to outputs/inputs of a second set of (other) computational elements 250, for performance of a second function or algorithm.

In the first apparatus embodiment, the various computational elements 250 are designed and grouped together, into the various adaptive and reconfigurable computation units 200 (as illustrated, for example, in FIGS. 5A through 9). In addition to computational elements 250 which are designed to execute a particular algorithm or function, such as multiplication or addition, other types of computational elements 250 are also utilized in the first apparatus embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing, and which may be utilized within the hardware task manager, discussed below.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIGS. 5A through 5E and FIG. 6). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 3 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 3. Lastly, a fifth type of computation unit 200 may be included to perform bit-level manipulation, such as for encryption, decryption, channel coding, Viterbi decoding, and packet and protocol processing (such as Internet Protocol processing).

In the first apparatus embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

As indicated above, the plurality of heterogeneous computational elements 250 may be configured and reconfigured, through the levels of the interconnect network (110, 210, 220, 240), for performance of a plurality of functional or operational modes, such as linear operations, non-linear operations, finite state machine operations, memory and memory management, and bit-level manipulation. This configuration and reconfiguration of the plurality of heterogeneous computational elements 250 through the levels of the interconnect network (110, 210, 220, 240), however, may be conceptualized on another, higher or more abstract level, namely, configuration and reconfiguration for the performance of a plurality of algorithmic elements.

At this more abstract level of the algorithmic element, the performance of any one of the algorithmic elements may be considered to require a simultaneous performance of a plurality of the lower-level functions or operations, such as move, input, output, add, subtract, multiply, complex multiply, divide, shift, multiply and accumulate, and so on, using a configuration (and reconfiguration) of computational elements having a plurality of fixed architectures such as memory, addition, multiplication, complex multiplication, subtraction, synchronization, queuing, over sampling, under sampling, adaptation, configuration, reconfiguration, control, input, output, and field programmability.

When such a plurality of fixed architectures are configured and reconfigured for performance of an entire algorithmic element, this performance may occur using comparatively few clock cycles, compared to the orders of magnitude more clock cycles typically required. The algorithmic elements may be selected from a plurality of algorithmic elements comprising, for example: a radix-2 Fast Fourier Transformation (FFT), a radix-4 Fast Fourier Transformation (FFT), a radix-2 inverse Fast Fourier Transformation (IFFT), a radix-4 IFFT, a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation. Numerous other algorithmic element examples are discussed in greater detail below with reference to FIG. 10.

In another embodiment of the ACE 100, one or more of the matrices (or nodes) 150 may be designed to be application specific, having a fixed architecture with a corresponding fixed function (or predetermined application), rather than being comprised of a plurality of heterogeneous computational elements which may be configured and reconfigured for performance of a plurality of operations, functions, or algorithmic elements. For example, an analog-to-digital (A/D) or digital-to-analog (D/A) converter may be implemented without adaptive capability. As discussed in greater detail below, common node (matrix) functions also may be implemented without adaptive capability, such as the node wrapper functions discussed below. Under various circumstances, however, the fixed function node may be capable of parameter adjustment for performance of the predetermined application. For example, the parameter adjustment may comprise changing one or more of the following parameters: a number of filter coefficients, a number of parallel input bits, a number of parallel output bits, a number of selected points for Fast Fourier Transformation, a number of bits of precision, a code rate, a number of bits of interpolation of a trigonometric function, and real or complex number valuation. This fixed function node (or matrix) 150, which may be parametizable, will typically be utilized in circumstances where an algorithmic element is used on a virtually continuous basis, such as in certain types of communications or computing applications.

For example, the fixed function node 150 may be a microprocessor (such as a RISC processor), a digital signal processor (DSP), or a co-processor, and may or may not have an embedded operating system. Such a controller or processor fixed function node 150 may be utilized for the various KARC 150A or MARC 150B applications mentioned above, such as providing configuration information to the interconnection network, directing and scheduling the configuration of the plurality of heterogeneous computational elements 250 of the other nodes 150 for performance of the various functional modes or algorithmic elements, or timing and scheduling the configuration and reconfiguration of the plurality of heterogeneous computational elements with corresponding data. In other applications, also for example, the fixed function node may be a cascaded integrated comb (CIC) filter or a parameterized, cascaded integrated comb (CIC) filter; a finite impulse response (FIR) filter or a finite impulse response (FIR) filter parameterized for variable filter length; or an A/D or D/A converter.

FIG. 4 is a block diagram illustrating, in greater detail, an exemplary or representative computation unit 200 of a reconfigurable matrix 150. As illustrated in FIG. 4, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the first apparatus embodiment, the selection of various input and output lines 281 and 291, and the creation of various connections through the interconnect (210, 220 and 240), is under control of control bits 265 from a computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes the computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 255 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of the various data flow graphs, generating decision nodes in such DFGs, and may also be used for data routing within such DFGs.

FIGS. 5A through 5E are block diagrams illustrating, in detail, exemplary fixed and specific computational elements, forming computational units. As will be apparent from review of these Figures, many of the same fixed computational elements are utilized, with varying configurations, for the performance of different algorithms.

Figure 5A:
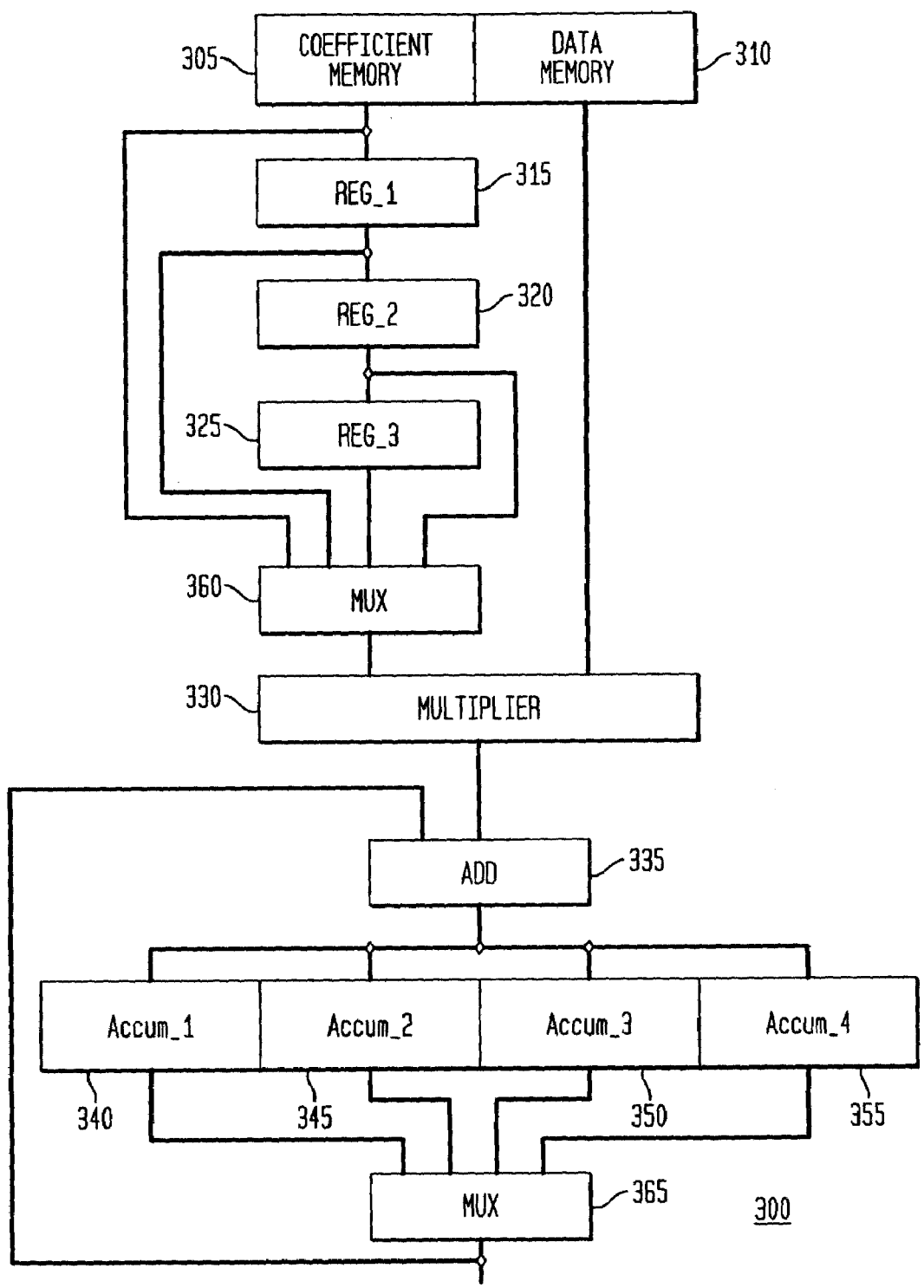
FIGS. 5A through 5E are block diagrams illustrating, in detail, exemplary fixed and specific computational elements, forming computational units.

FIG. 5A is a block diagram illustrating a four-point asymmetric finite impulse response (FIR) filter computational unit 300. As illustrated, this exemplary computational unit 300 includes a particular, first configuration of a plurality of fixed computational elements, including coefficient memory 305, data memory 310, registers 315, 320 and 325, multiplier 330, adder 335, and accumulator registers 340, 345, 350 and 355, with multiplexers (MUXes) 360 and 365 forming a portion of the interconnection network (210, 220 and 240).

Figure 5B:
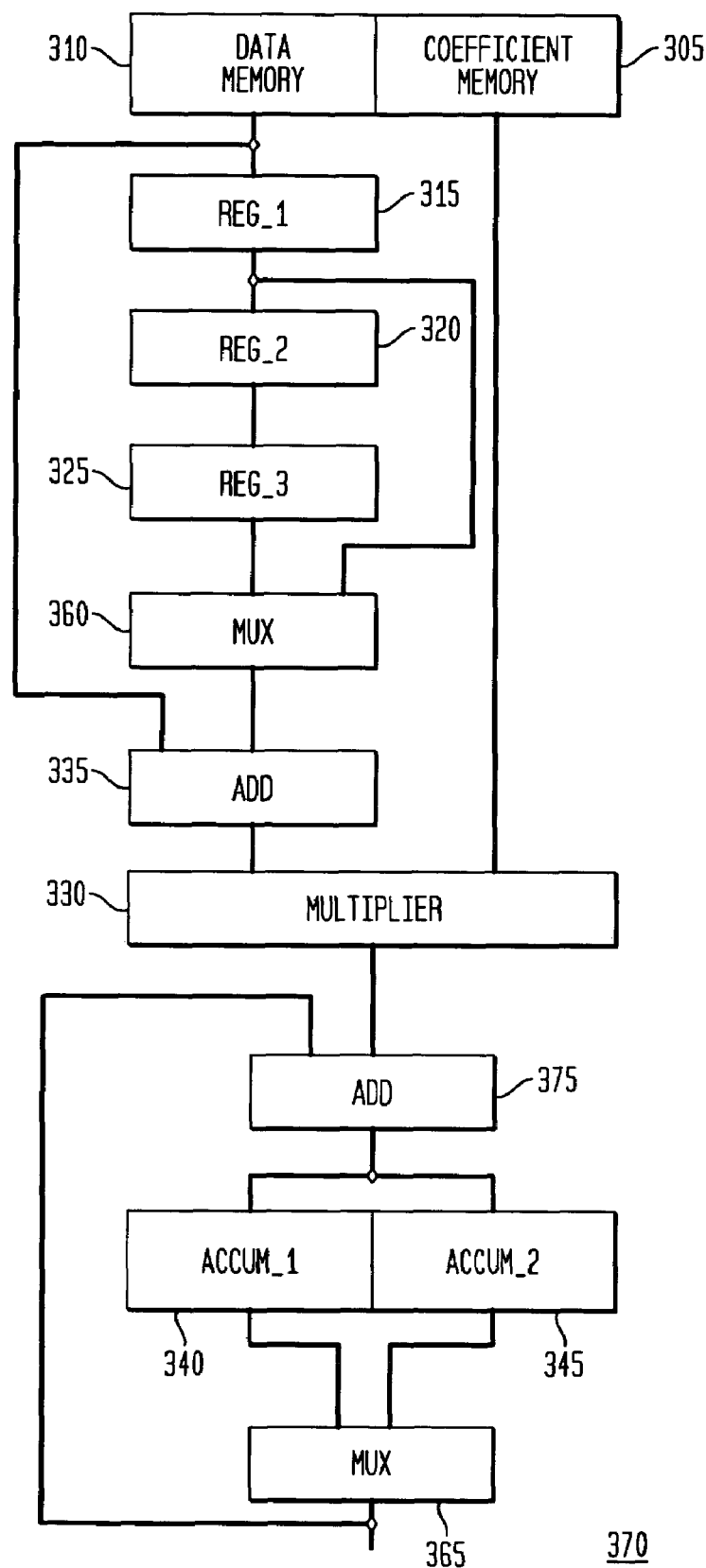

FIG. 5B is a block diagram illustrating a two-point symmetric finite impulse response (FIR) filter computational unit 370. As illustrated, this exemplary computational unit 370 includes a second configuration of a plurality of fixed computational elements, including coefficient memory 305, data memory 310, registers 315, 320 and 325, multiplier 330, adder 335, second adder 375, and accumulator registers 340 and 345, also with multiplexers (MUXes) 360 and 365 forming a portion of the interconnection network (210, 220 and 240).

Figure 5C:
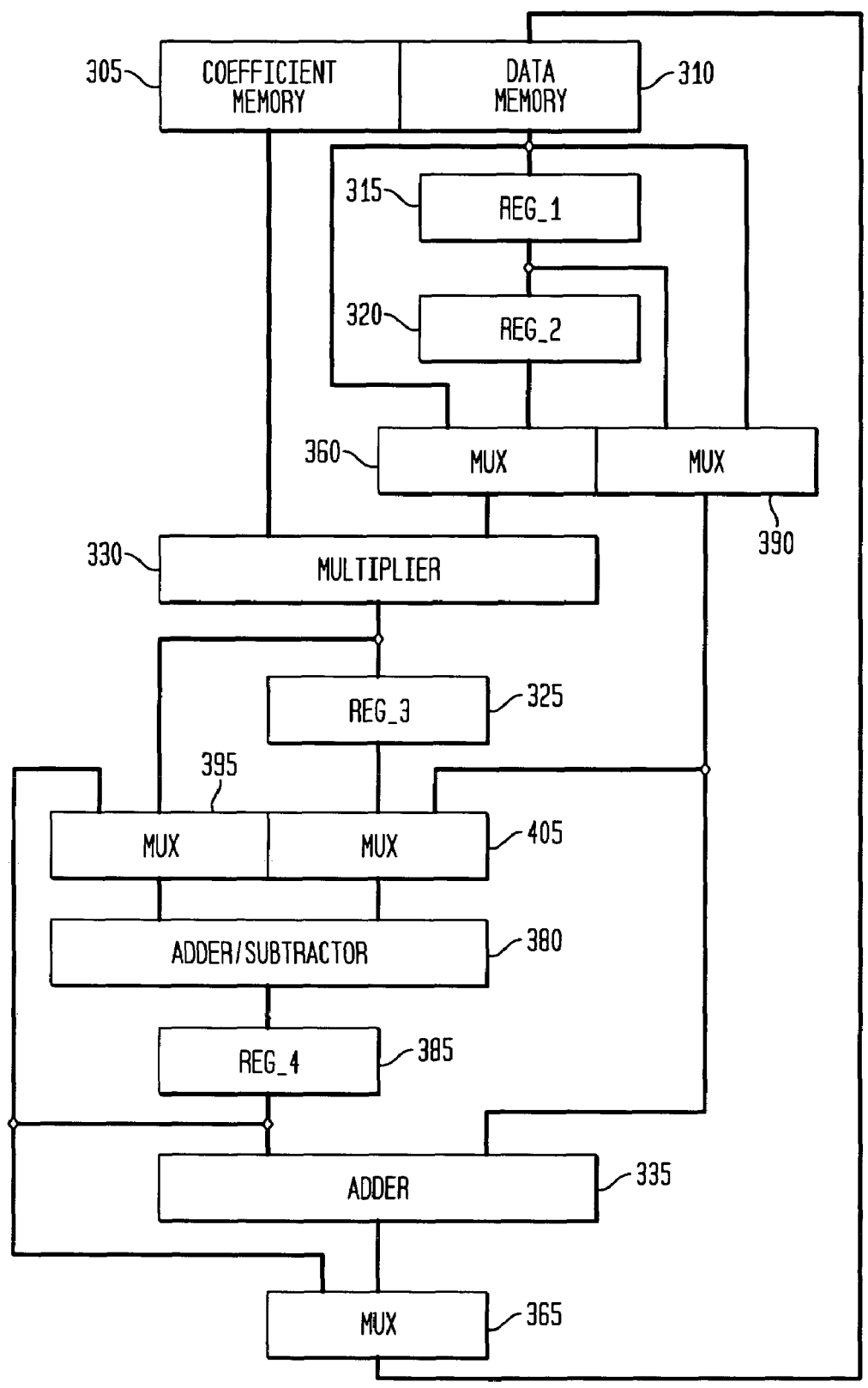

FIG. 5C is a block diagram illustrating a subunit for a fast Fourier transform (FFT) computational unit 400. As illustrated, this exemplary computational unit 400 includes a third configuration of a plurality of fixed computational elements, including coefficient memory 305, data memory 310, registers 315, 320, 325 and 385, multiplier 330, adder 335, and adder/subtractor 380, with multiplexers (MUxes) 360, 365, 390, 395 and 405 forming a portion of the interconnection network (210, 220 and 240).

Figure 5D:
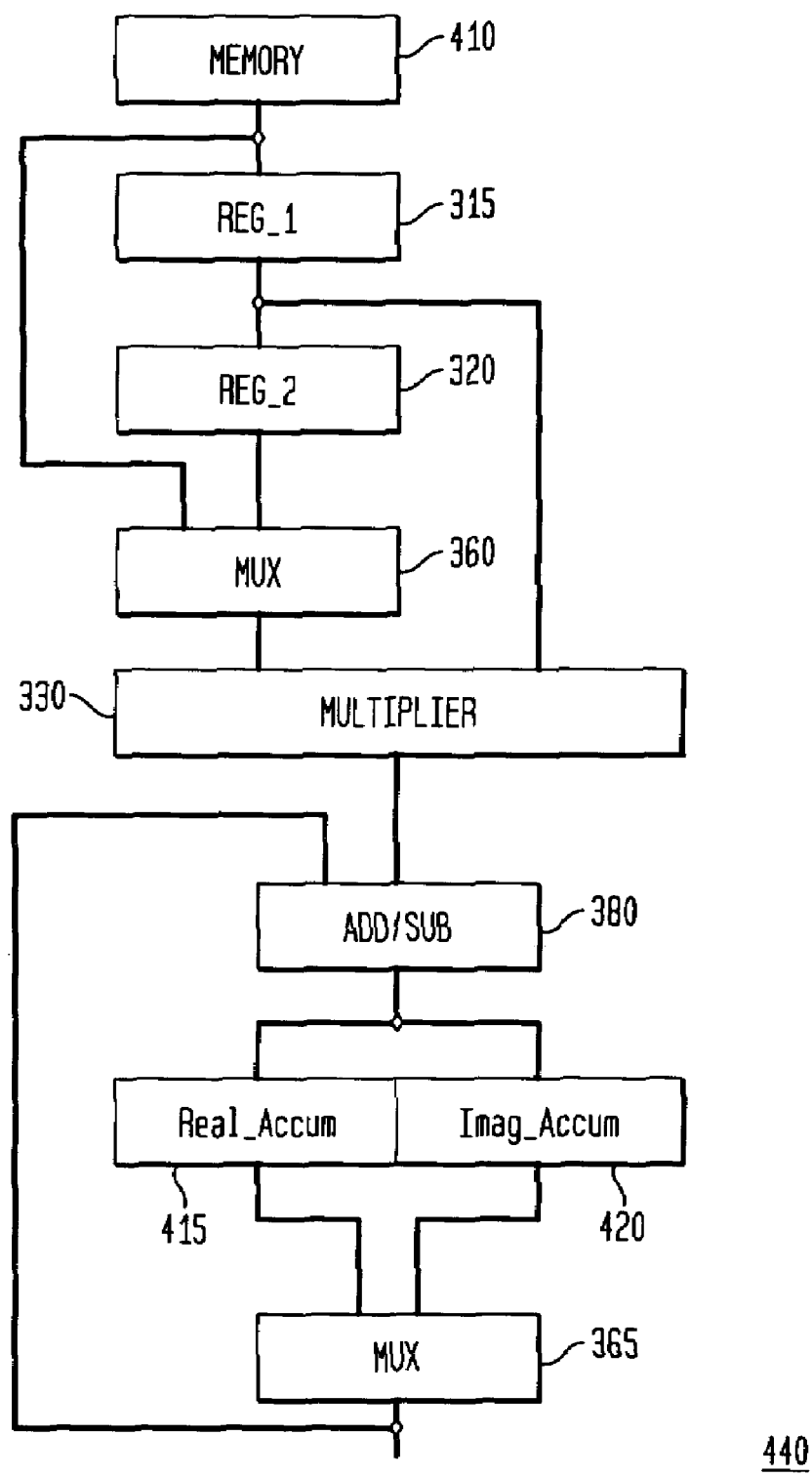

FIG. 5D is a block diagram illustrating a complex finite impulse response (FIR) filter computational unit 440. As illustrated, this exemplary computational unit 440 includes a fourth configuration of a plurality of fixed computational elements, including memory 410, registers 315 and 320, multiplier 330, adder/subtractor 380, and real and imaginary accumulator registers 415 and 420, also with multiplexers (MUXes) 360 and 365 forming a portion of the interconnection network (210, 220 and 240).

Figure 5E:
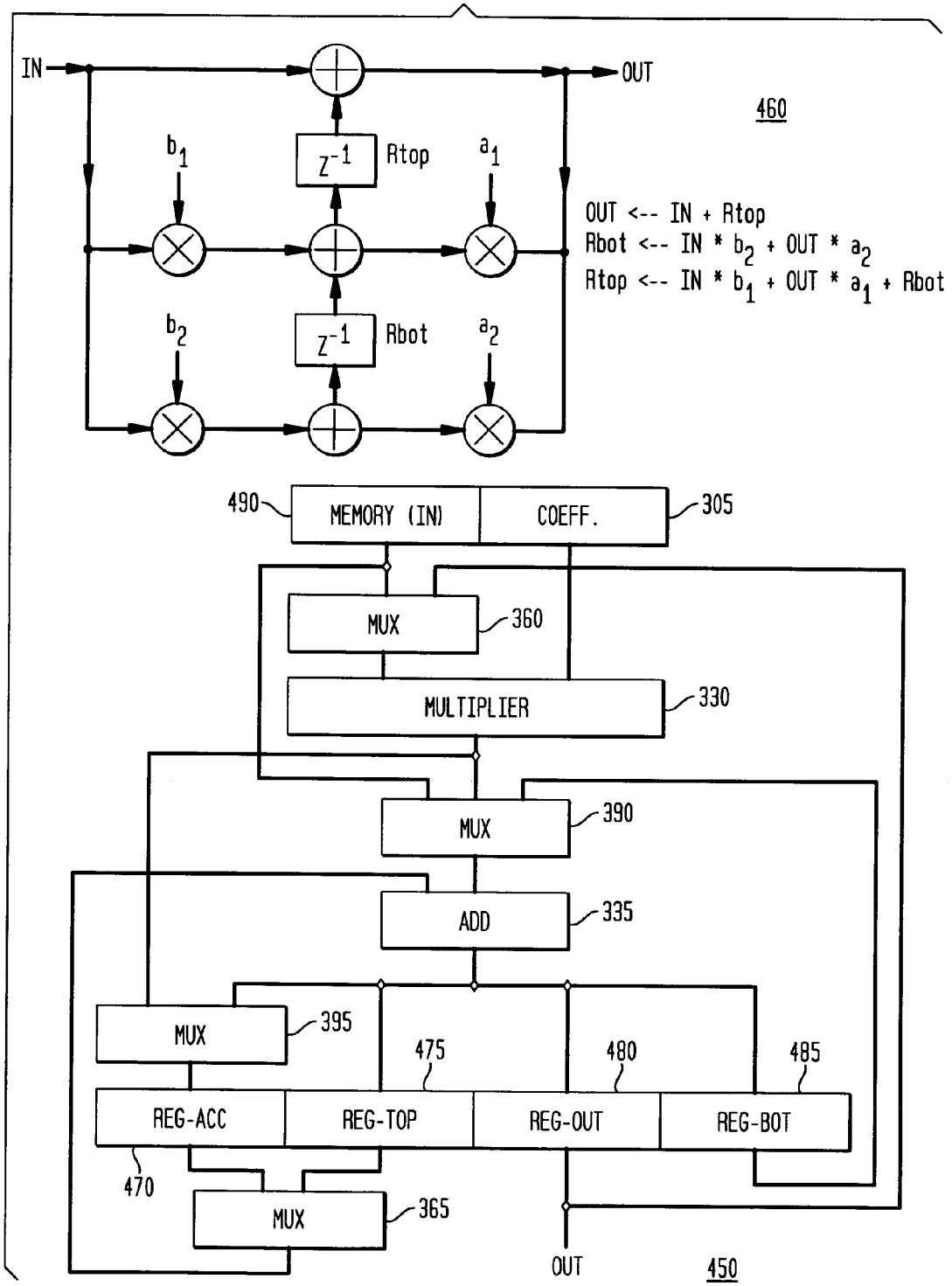

FIG. 5E is a block diagram illustrating a biquad infinite impulse response (IIR) filter computational unit 450, with a corresponding data flow graph 460. As illustrated, this exemplary computational unit 450 includes a fifth configuration of a plurality of fixed computational elements, including coefficient memory 305, input memory 490, registers 470, 475, 480 and 485, multiplier 330, and adder 335, with multiplexers (MUXes) 360, 365, 390 and 395 forming a portion of the interconnection network (210, 220 and 240).

Figure 6:
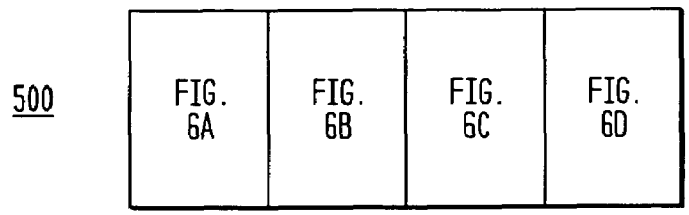
FIG. 6 is a block diagram illustrating, in detail, an exemplary multi-function adaptive computational unit having a plurality of different, fixed computational elements.
Figure 6A:
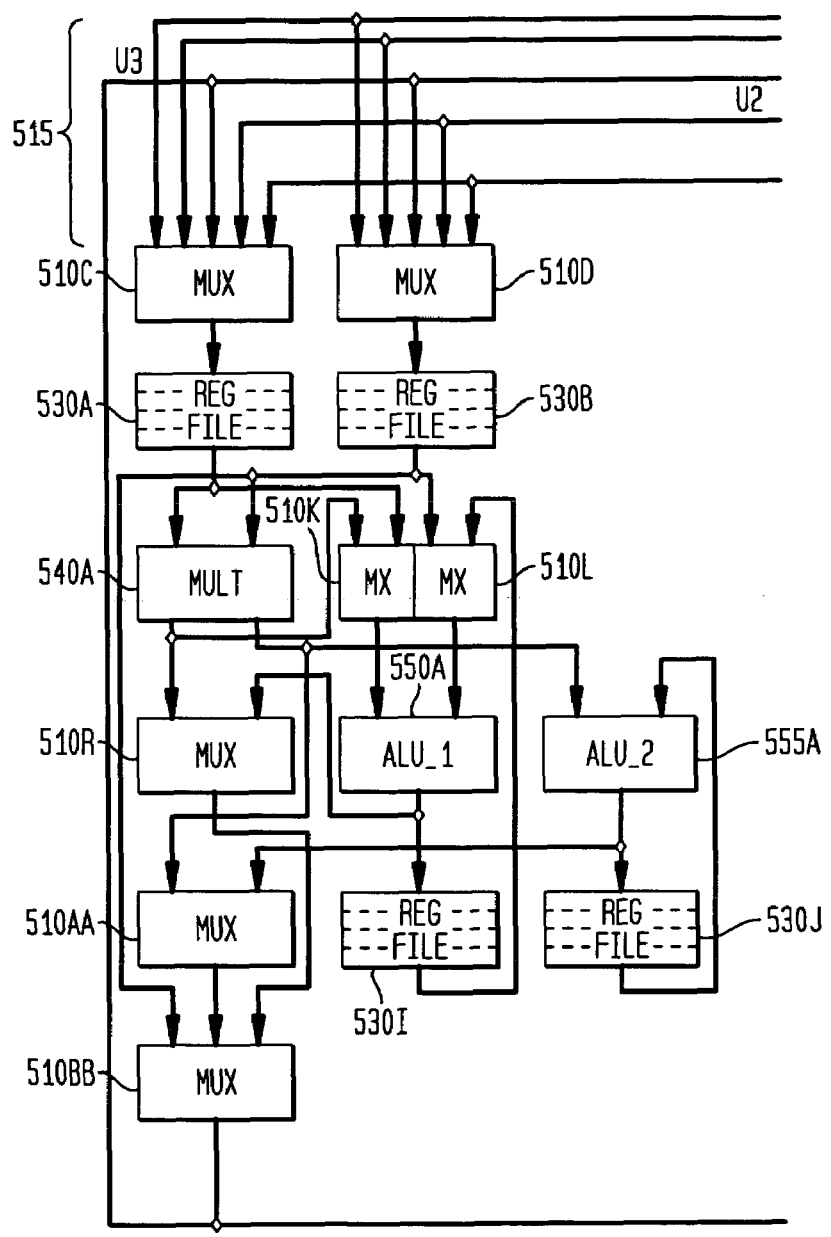
Figure 6B:
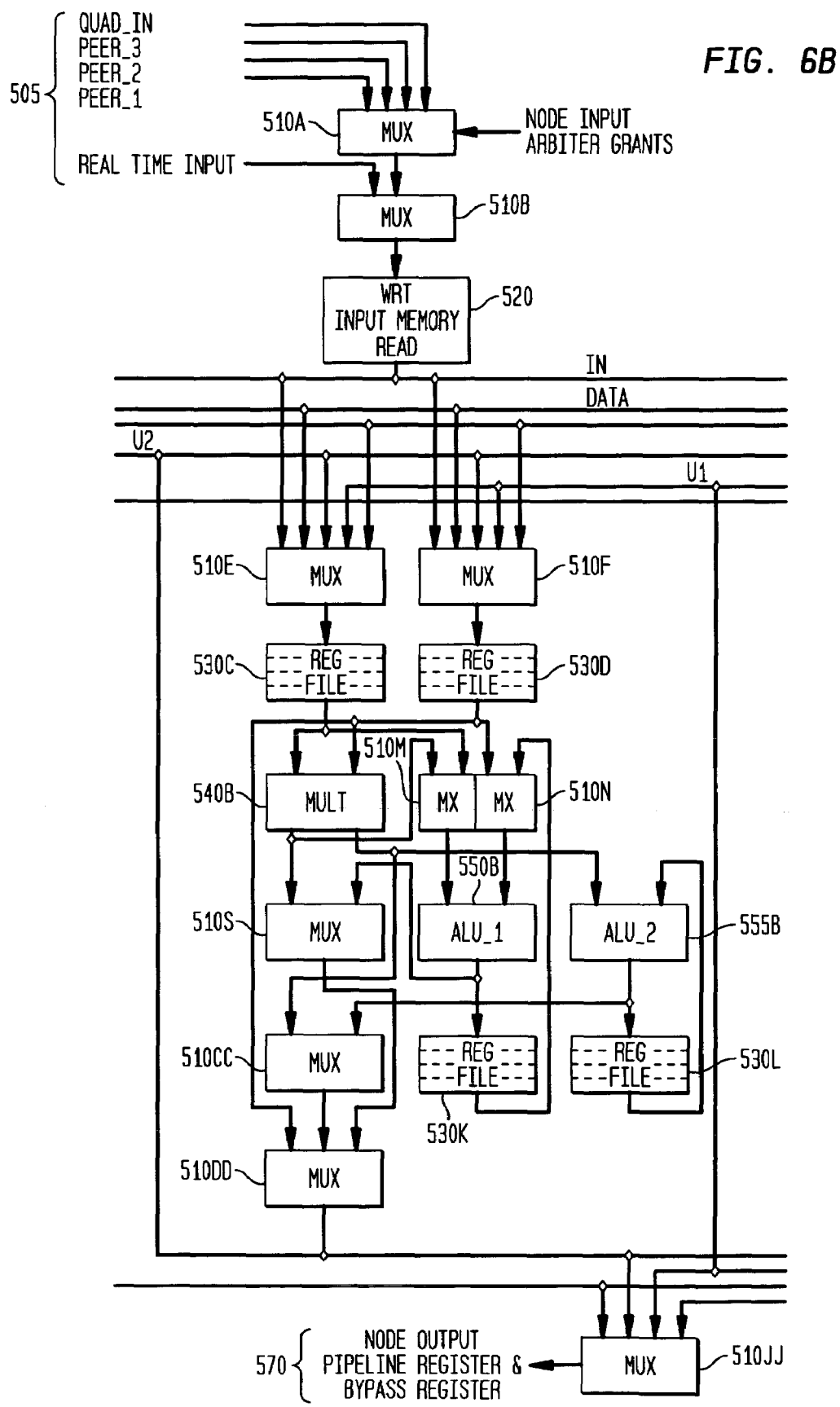
Figure 6C:
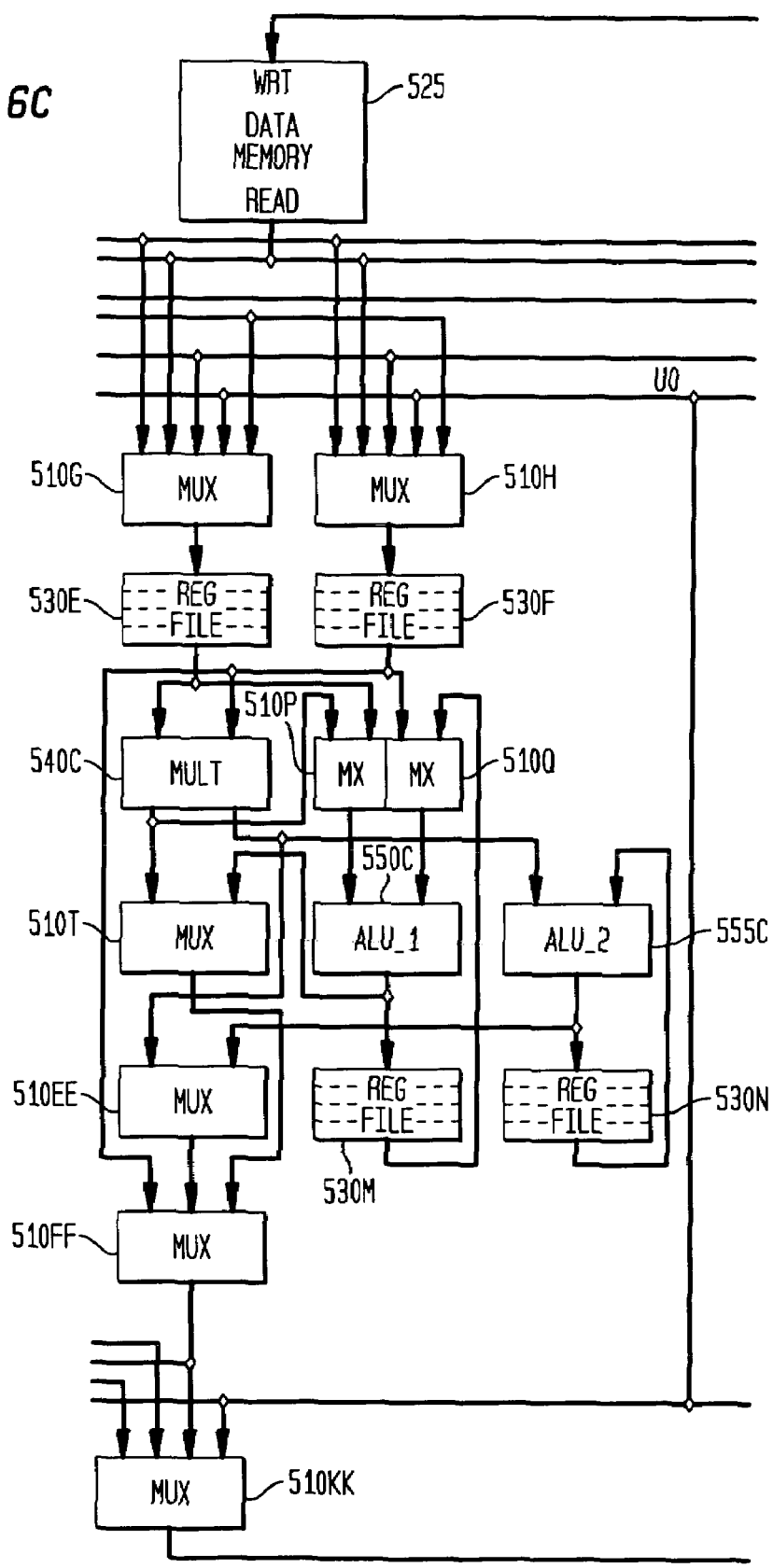
Figure 6D:
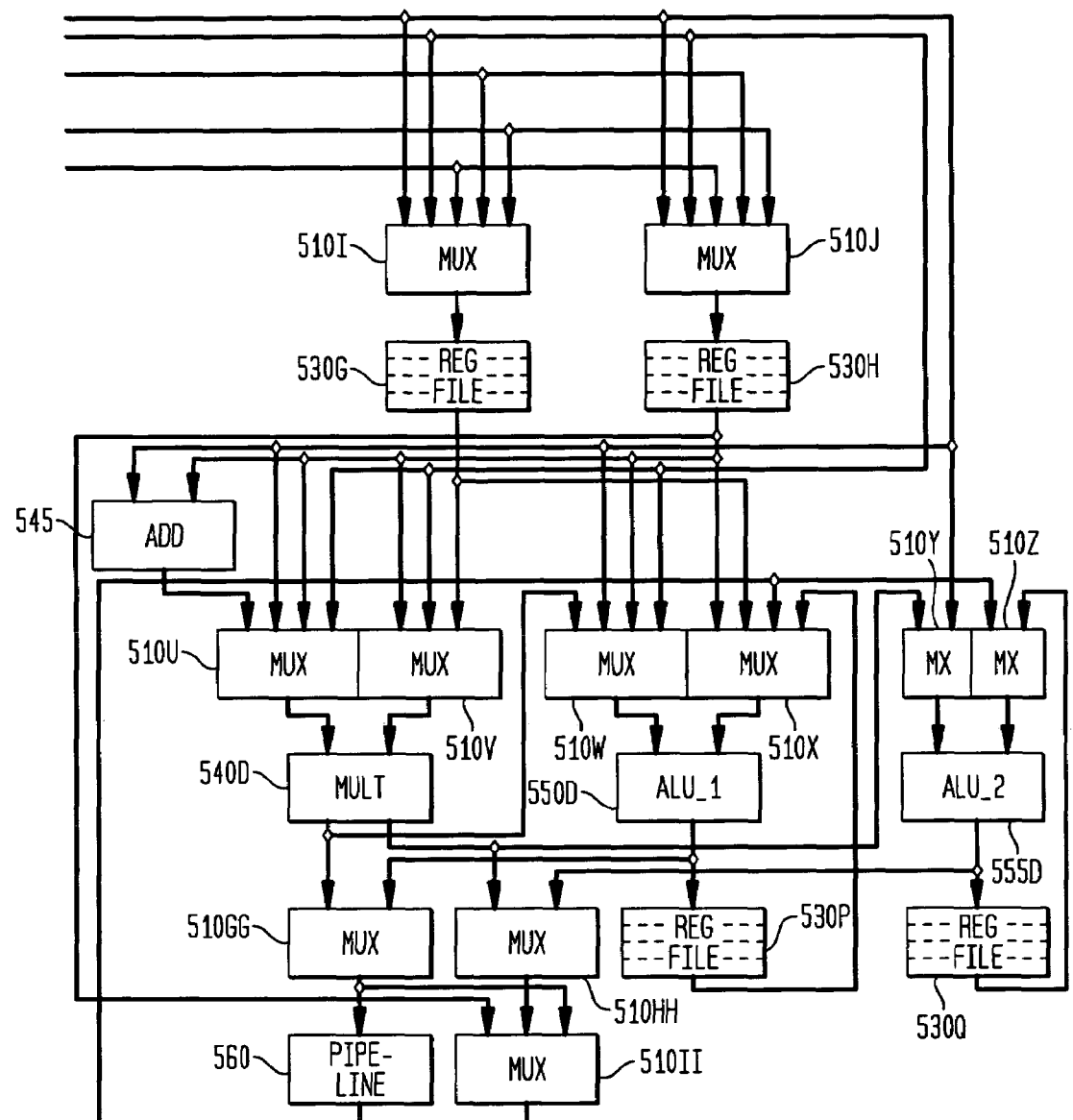

FIG. 6 is a block diagram illustrating, in detail, an exemplary multi-function adaptive computational unit 500 having a plurality of different, fixed computational elements. When configured accordingly, the adaptive computation unit 500 performs each of the various functions previously illustrated with reference to FIGS. 5A though 5E, plus other functions such as discrete cosine transformation. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length 1) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 7:
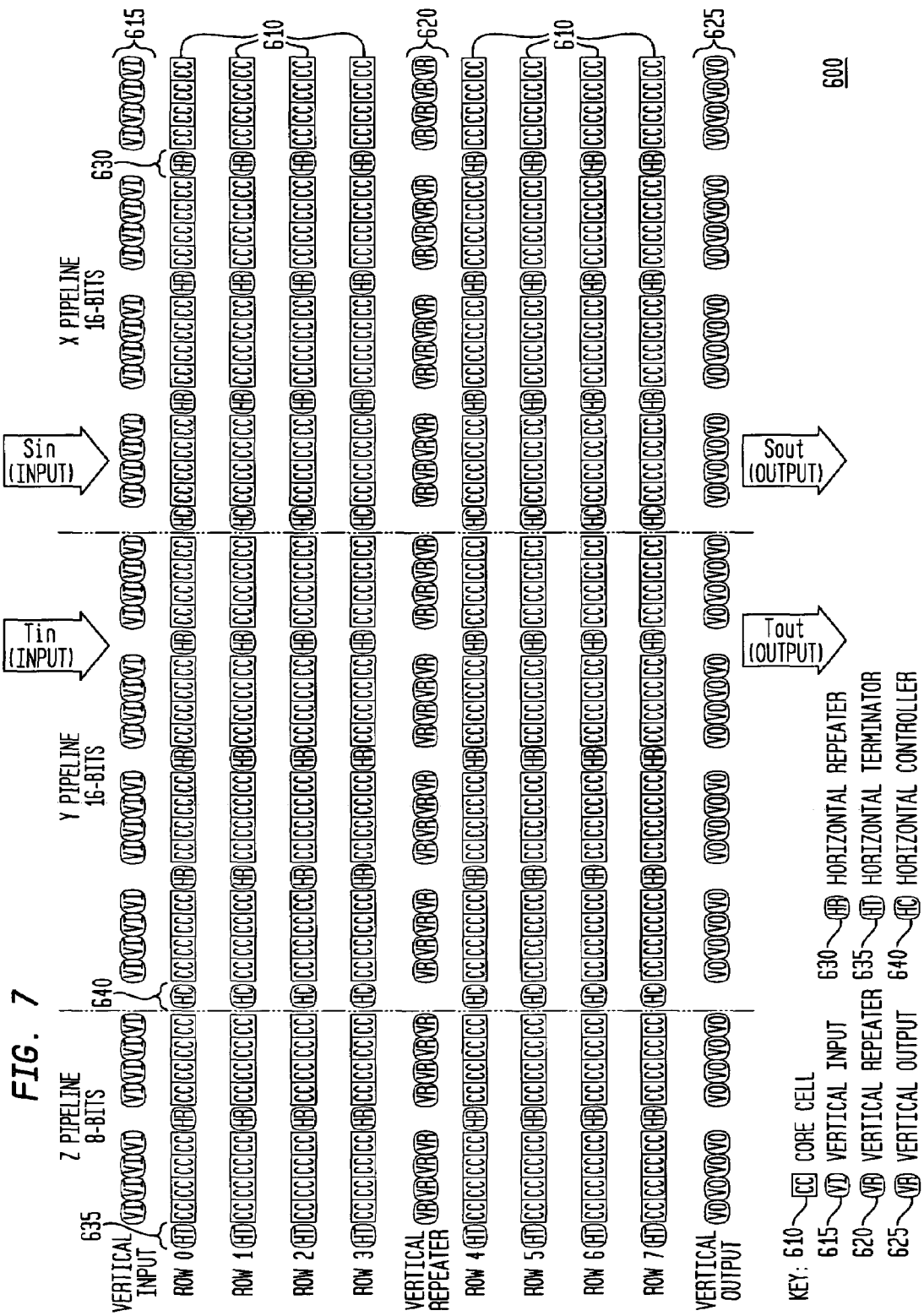
FIG. 7 is a block diagram illustrating, in detail, an adaptive logic processor computational unit having a plurality of fixed computational elements.

FIG. 7 is a block diagram illustrating, in detail, an exemplary adaptive logic processor (ALP) computational unit 600 having a plurality of fixed computational elements. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 8), as separately illustrated in FIG. 9. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 8:
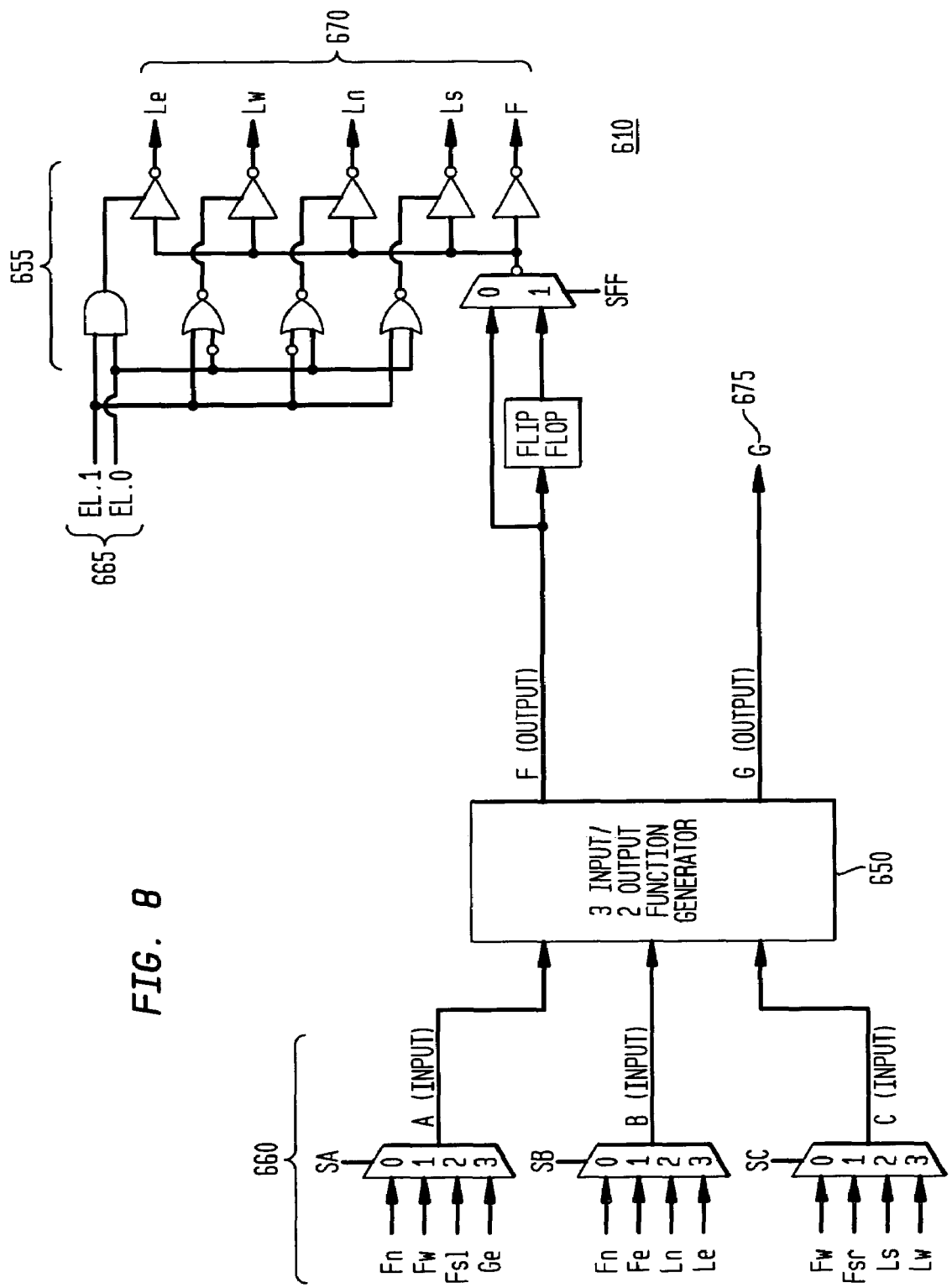
FIG. 8 is a block diagram illustrating, in greater detail, an exemplary core cell of an adaptive logic processor computational unit with a fixed computational element.

FIG. 8 is a block diagram illustrating, in greater detail, an exemplary core cell 610 of an adaptive logic processor computational unit 600 with a fixed computational element 650. The fixed computational element is a 3 input–2 output function generator 550, separately illustrated in FIG. 9. The preferred core cell 610 also includes control logic 655, control inputs 665, control outputs 670 (providing output interconnect), output 675, and inputs (with interconnect muxes) 660 (providing input interconnect).

Figure 9:
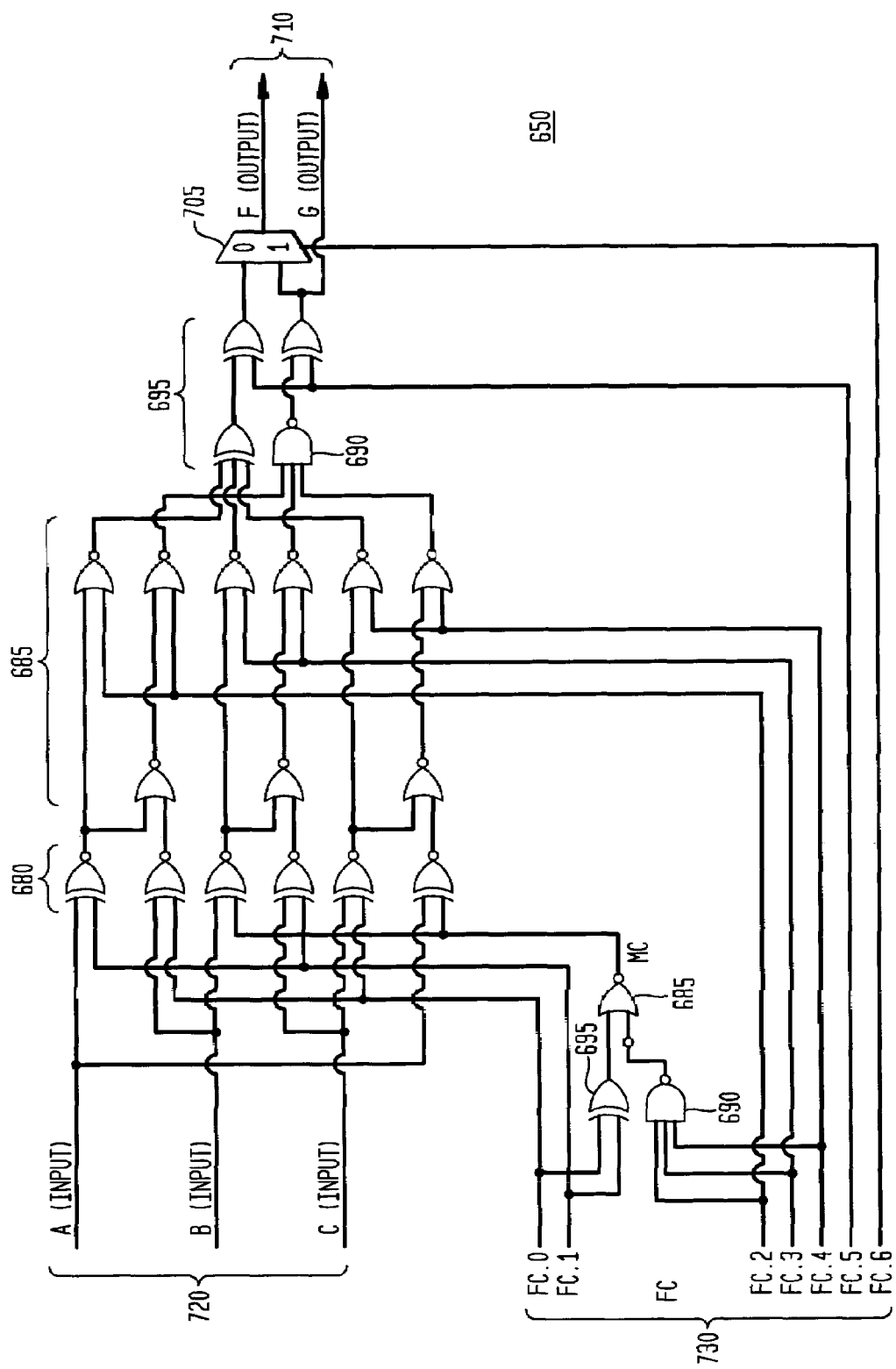
FIG. 9 is a block diagram illustrating, in greater detail, an exemplary fixed computational element of a core cell of an adaptive logic processor computational unit.

FIG. 9 is a block diagram illustrating, in greater detail, an exemplary fixed computational element 650 of a core cell 610 of an adaptive logic processor computational unit 600. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

Figure 10:
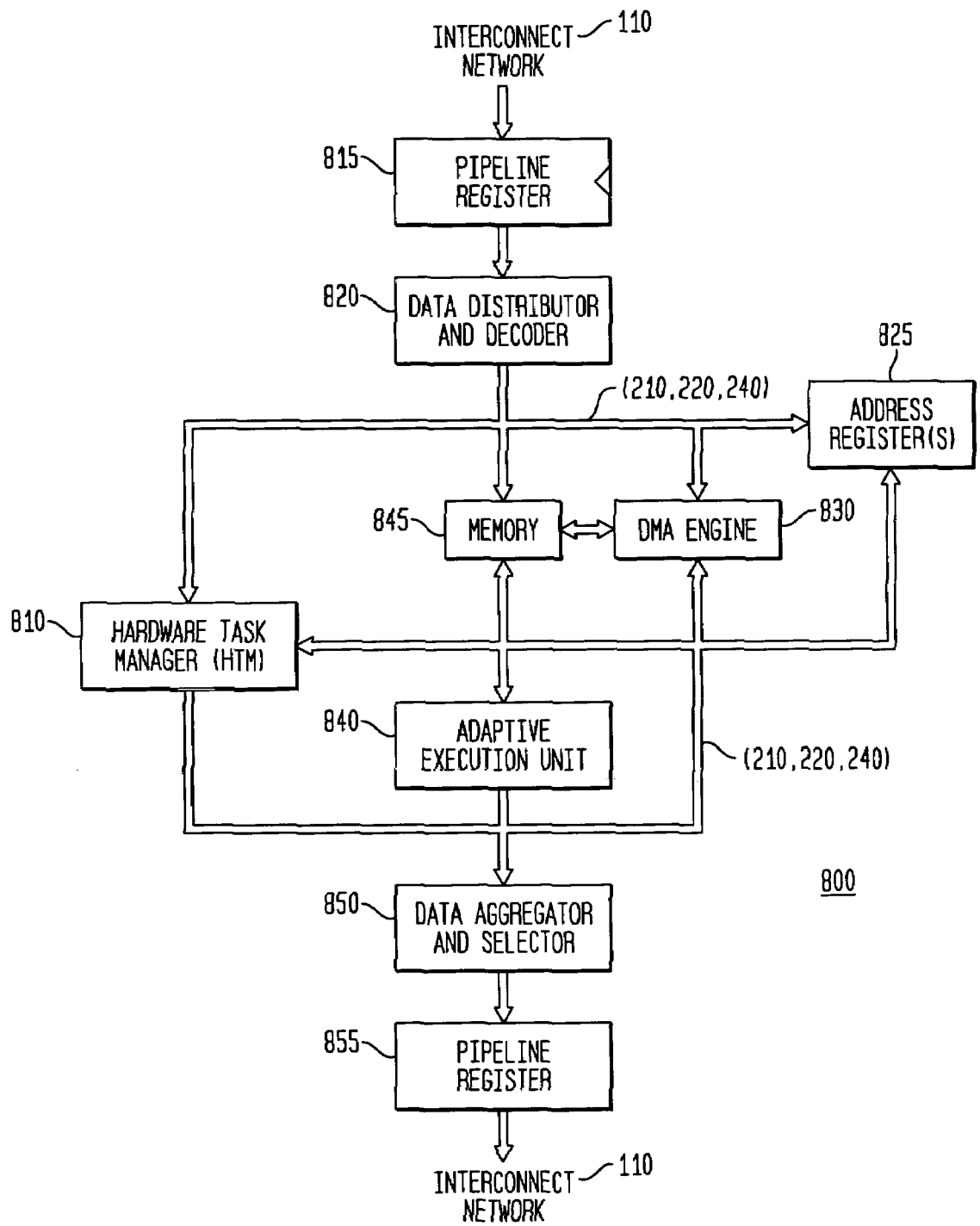
FIG. 10 is a block diagram illustrating a second exemplary apparatus embodiment in accordance with the present invention.

FIG. 10 is a block diagram illustrating a prototypical node or matrix 800 comprising the second apparatus embodiment. The node 800 is connected to other nodes 150 within the ACE 100 through the matrix interconnection network 110. The prototypical node 800 includes a fixed (and non-reconfigurable) "node wrapper", an adaptive (reconfigurable) execution unit 840, and a memory 845 (which also may be variable). This fixed and non-reconfigurable "node wrapper" includes an input pipeline register 815, a data decoder and distributor 820, a hardware task manager 810, an address register 825 (optional), a DMA engine 830 (optional), a data aggregator and selector 850, and an output pipeline register 855. These components comprising the node wrapper are generally common to all nodes of the ACE 100, and are comprised of fixed architectures (i.e., application-specific or non-reconfigurable architectures). As a consequence, the node or matrix 800 is a unique blend of fixed, non-reconfigurable node wrapper components, memory, and the reconfigurable components of an adaptive execution unit 840 (which, in turn, are comprised of fixed computational elements and an interconnection network).

Various nodes 800, in general, will have a distinctive and variably-sized adaptive execution unit 840, tailored for one or more particular applications or algorithms, and a memory 845, also implemented in various sizes depending upon the requirements of the adaptive execution unit 840. An adaptive execution unit 840 for a given node 800 will generally be different than the adaptive execution units 840 of the other nodes 800. Each adaptive execution unit 840 is reconfigurable in response to configuration information, and is comprised of a plurality of computation units 200, which are in turn further comprised of a plurality of computational elements 250, and corresponding interconnect networks 210, 220 and 240. Particular adaptive execution units 840 utilized in exemplary embodiments, and the operation of the node 800 and node wrapper, are discussed in greater detail below.

Figure 11:
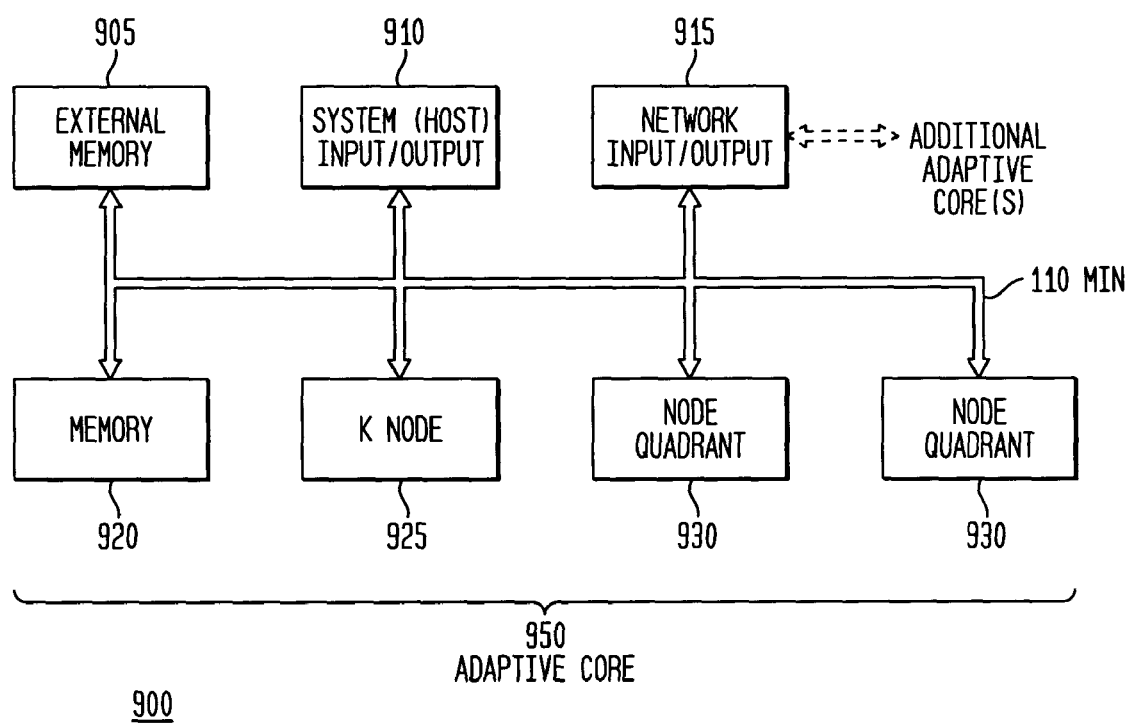
FIG. 11 is a block diagram illustrating an exemplary first system embodiment in accordance with the present invention.

FIG. 11 is a block diagram illustrating a first system embodiment 900. This first system 900 may be included as part of a larger system or host environment, such as within a computer or communications device, for example. FIG. 11 illustrates a "root" level of such a system 100, where global resources have connectivity (or otherwise may be found). At this root level, the first system 900 includes one or more adaptive cores 950, external (off-IC or off-chip) memory 905 (such as SDRAM), host (system) input and output connections, and network (MIN 110) input and output connections (for additional adaptive cores 950). Each adaptive core 950 includes (on-IC or on-chip) memory 920, a "K-node" 925, and one or more sets of nodes (150, 800) referred to as a node quadrant 930. The K-node 925 (like the kernel controller 150A) provides an operating system for the adaptive core 950. Generally, each node quadrant 930 consists of 16 nodes in a scalable by-four (×4) fractal arrangement. At this root level, each of these (seven) illustrated elements has total connectivity with all other (six) elements. As a consequence, the output of a root-level element is provided to (and may drive) all other root-level inputs, and the input of each root-level input is provided with the outputs of all other root-level elements. Not separately illustrated, at this root-level of the first system 900, the MIN 110 includes a network with routing (or switching) elements (935), such as round-robin, token ring, cross point switches, or other arbiter elements, and a network (or path) for real time data transfer (or transmission) (such as a data network 240).

Figure 12:
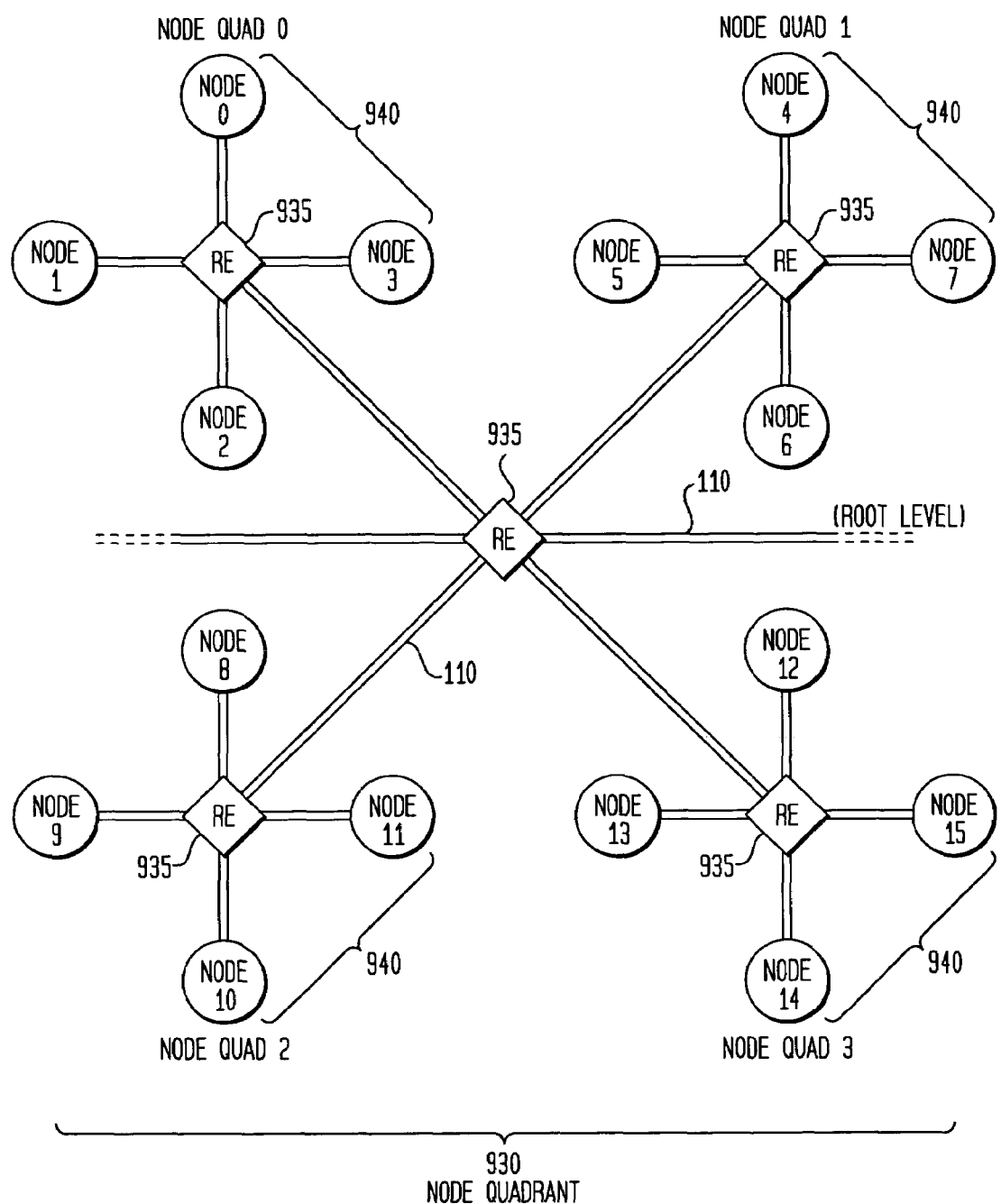
FIG. 12 is a block diagram illustrating an exemplary node quadrant with routing elements in accordance with the present invention.

FIG. 12 is a block diagram illustrating an exemplary node quadrant 930 with routing elements 935. From the root-level, the node quadrant 930 has a tree topology and consists of 16 nodes (150 or 800), with every four nodes connected as a node "quad" 940 having a routing (or switching) element 935. The routing elements may be implemented variously, such as through round-robin, token ring, cross point switches, (four-way) switching, (¼, ⅓ or ½) arbitration or other arbiter or arbitration elements, or depending upon the degree of control overhead which may be tolerable, through other routing or switching elements such as multiplexers and demultiplexers. This by-four fractal architecture provides for routing capability, scalability, and expansion, without logical limitation. The node quadrant 930 is coupled within the first system 900 at the root-level, as illustrated. This by-four fractal architecture also provides for significant and complete connectivity, with the worst-case distance between any node being $\log_4$ of "k" hops (or number of nodes) (rather than a linear distance), and provides for avoiding the overhead and capacitance of, for example, a full crossbar switch or busses.

The node quadrant 930 and node quad 940 structures exhibit a fractal self-similarity with regard to scalability, repeating structures, and expansion. The node quadrant 930 and node quad 940 structures also exhibit a fractal self-similarity with regard to a heterogeneity of the plurality of heterogeneous and reconfigurable nodes 800, heterogeneity of the plurality of heterogeneous computation units 200, and heterogeneity of the plurality of heterogeneous computational elements 250. With regard to the increasing heterogeneity, the adaptive computing integrated circuit 900 exhibits increasing heterogeneity from a first level of the plurality of heterogeneous and reconfigurable matrices, to a second level of the plurality of heterogeneous computation units, and further to a third level of the plurality of heterogeneous computational elements. The plurality of interconnection levels also exhibit a fractal self-similarity with regard to each interconnection level of the plurality of interconnection levels. At increasing depths within the ACE 100, from the matrix 150 level to the computation unit 200 level and further to the computational element 250 level, the interconnection network is increasingly rich, providing an increasing amount of bandwidth and an increasing number of connections or connectability for a correspondingly increased level of reconfigurability. As a consequence, the matrix-level interconnection network, the computation unit-level interconnection network, and the computational element-level interconnection network also constitute a fractal arrangement.

Referring to FIGS. 11 and 12, and as explained in greater detail below, the system embodiment 900 utilizes point-to-point service for streaming data and configuration information transfer, using a data packet (or data structure) discussed below. A packet-switched protocol is utilized for this communication, and in an exemplary embodiment the packet length is limited to a single word (of length 51 bits) to obviate any need for data buffering. The routing information within the data packet provides for selecting the particular adaptive core 950, followed by selecting root-level (or not) of the selected adaptive core 950, followed by selecting a particular node (110 or 800) of the selected adaptive core 950. This selection path may be visualized by following the illustrated connections of FIGS. 11 and 12. Routing of data packets out of a particular node may be performed similarly, or may be provided more directly, such as by switching or arbitrating within a node 800 or quad 940, as discussed below.

Figure 13:
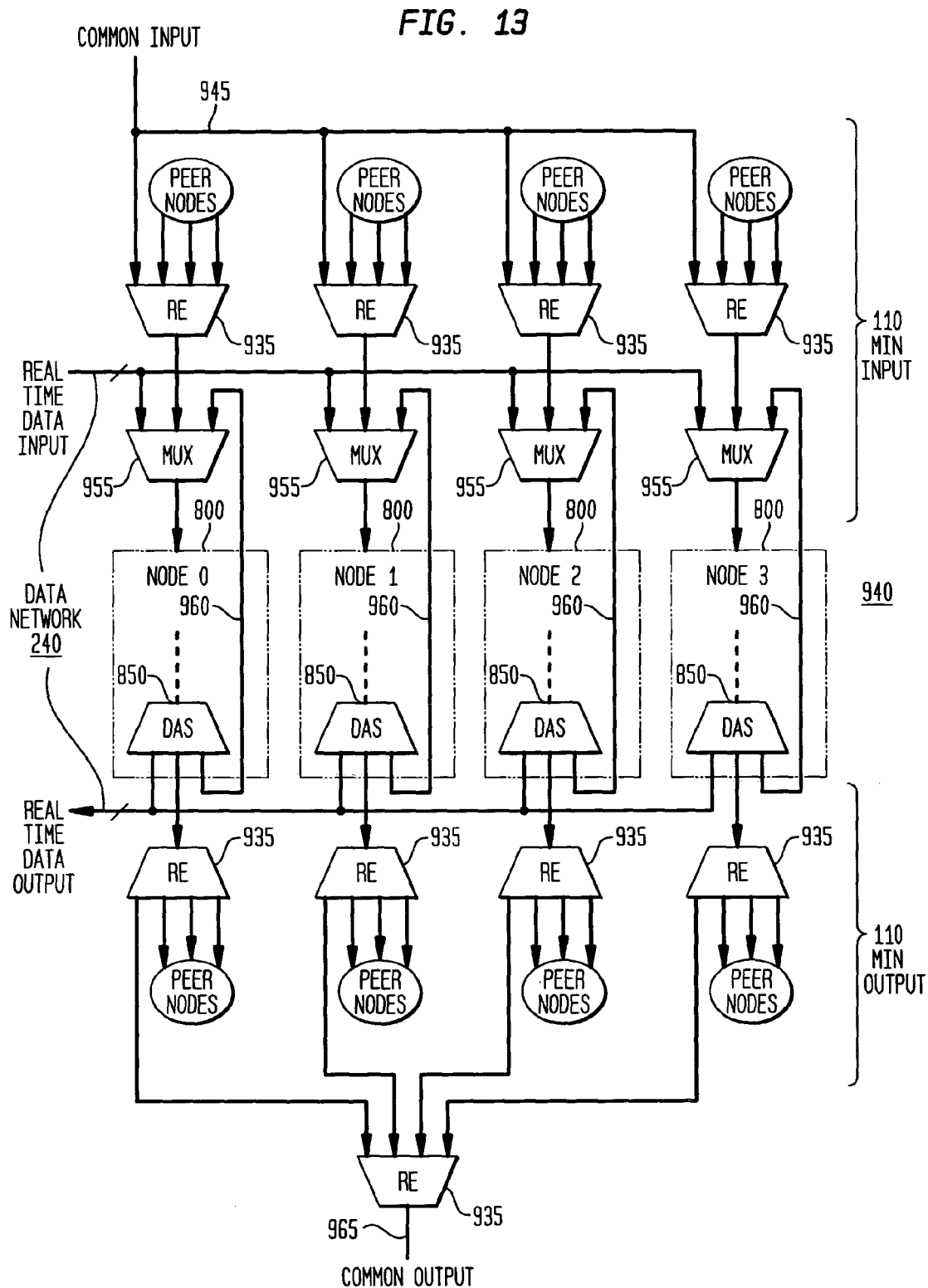
FIG. 13 is a block diagram illustrating exemplary network interconnections in accordance with the present invention.

FIG. 13 is a block diagram illustrating exemplary network interconnections into and out of nodes 800 and node quads 940. Referring to FIG. 13, MIN 100 connections into a node, via a routing element 935, include a common input 945 (provided to all four nodes 800 within a quad 940), and inputs from the other (three) "peer" nodes within the particular quad 940. For example, outputs from peer nodes 1, 2 and 3 are utilized for input into node 0, and so on. At this level, the routing element 935 may be implemented, for example, as a round-robin, token ring, arbiter, cross point switch, or other four-way switching element. The output from the routing element 935 is provided to a multiplexer 955 (or other switching element) for the corresponding node 800, along with a feedback input 960 from the corresponding node 800, and an input for real time data (from data network 240) (to provide a fast track for input of real time data into nodes 800). The multiplexer 955 (or other switching element) provides selection (switching or arbitration) of one of 3 inputs, namely, selection of input from the selected peer or common 945, selection of input from the same node as feedback, or selection of input of real time data, with the output of the multiplexer 955 provided as the network (MIN 110) input into the corresponding node 800 (via the node's pipeline register 815).

The node 800 output is provided to the data aggregator and selector ("DAS") 850 within the node 800, which determines the routing of output information to the node itself (same node feedback), to the network (MIN 110) (for routing to another node or other system element), or to the data network 240 (for real time data output). When the output information is selected for routing to the MIN 110, the output from the DAS 850 is provided to the corresponding output routing element 935, which routes the output information to peer nodes within the quad 940 or to another, subsequent routing element 935 for routing out of the particular quad 940 through a common output 965 (such for routing to another node quad 940, node quadrant 930, or adaptive core 950).

Figure 14:
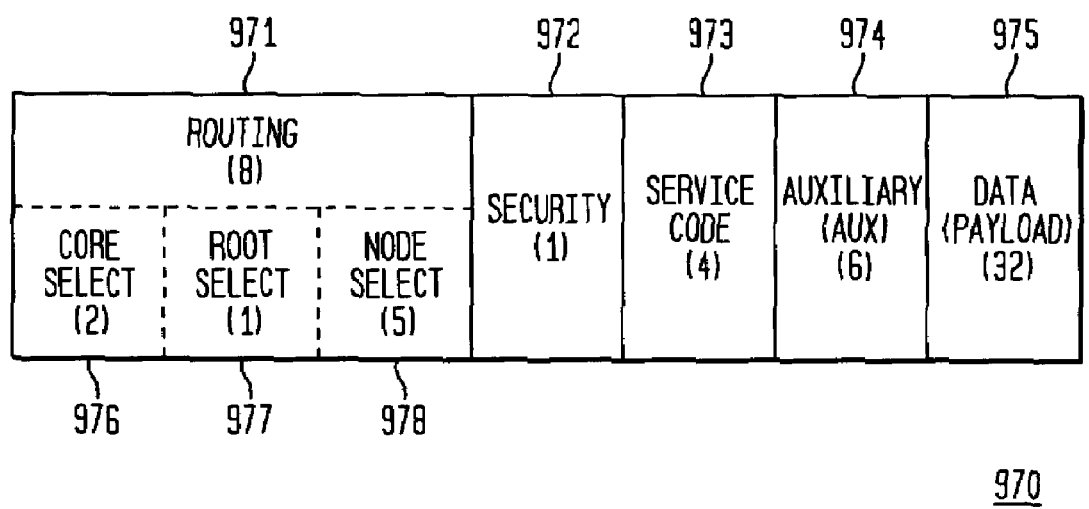
FIG. 14 is a block diagram illustrating an exemplary data structure embodiment in accordance with the present invention.

FIG. 14 is a block diagram illustrating an exemplary data structure embodiment. The system embodiment 900 utilizes point-to-point data and configuration information transfer, using a data packet (as an exemplary data structure) 970, and may be considered as an exemplary form of "silverware", as previously described herein. The exemplary data packet 970 provides for 51 bits per packet, with 8 bits provided for a routing field (971), 1 bit for a security field (972), 4 bits for a service code field (973), 6 bits for an auxiliary field (974), and 32 bits (one word length) for data (as a data payload or data field) (975). As indicated above, the routing field 971 may be further divided into fields for adaptive core selection (976), root selection (977), and node selection (978). In this selected 51-bit embodiment, up to four adaptive cores may be selected, and up to 32 nodes per adaptive core. As the packet is being routed, the routing bits may be stripped from the packet as they are being used in the routing process. The service code field 973 provides for designations such as point-to-point inter-process communication, acknowledgements for data flow control, "peeks" and "pokes" (as coined terminology referring to reads and writes by the K-node into memory 845), DMA operations (for memory moves), and random addressing for reads and writes to memory 845. The auxiliary (AUX) field 974 supports up to 32 streams for any of up to 32 tasks for execution on the adaptive execution unit 840, as discussed below, and may be considered to be a configuration information payload. The one word length (32-bit) data payload is then provided in the data field 975. The exemplary data structure 970 (as a data packet) illustrates the interdigitation of data and configuration/control information, as discussed above.

Referring to FIG. 10, in light of the first system 900 structure and data structure discussed above, the node 800 architecture of the second apparatus embodiment may be described in more detail. The input pipeline register 815 is utilized to receive data and configuration information from the network interconnect 110. Preferably, the input pipeline register 815 does not permit any data stalls. More particularly, in accordance with the data flow modeling of the present invention, the input pipeline register 815 should accept new data from the interconnection network 110 every clock period; consequently, the data should also be consumed as it is produced. This imposes the requirement that any contention issues among the input pipeline register 815 and other resources within the node 800 be resolved in favor of the input pipeline register 815, i.e., input data in the input pipeline register has priority in the selection process implemented in various routing (or switching) elements 935, multiplexers 955, or other switching or arbitration elements which may be utilized.

The data decoder and distributor 820 interfaces the input pipeline register 815 to the various memories (e.g., 845) and registers (e.g., 825) within the node 800, the hardware task manager 810, and the DMA engine 830, based upon the values in the service and auxiliary fields of the 51-bit data structure. The data decoder 820 also decodes security, service, and auxiliary fields of the 51-bit network data structure (of the configuration information or of operand data) to direct the received word to its intended destination within the node 800.

Conversely, data from the node 800 to the network (MIN 110 or to other nodes) is transferred via the output pipeline register 855, which holds data from one of the various memories (845) or registers (e.g., 825 or registers within the adaptive execution unit 840) of the node 800, the adaptive execution unit 840, the DMA engine 830, and/or the hardware task manager 810. Permission to load data into the output pipeline register 855 is granted by the data aggregator and selector (DAS) 850, which arbitrates or selects between and among any competing demands of the various (four) components of the node 800 (namely, requests from the hardware task manager 810, the adaptive execution unit 840, the memory 845, and the DMA engine 830). The data aggregator and selector 850 will issue one and only one grant whenever there is one or more requests and the output pipeline register 855 is available. In the selected embodiment, the priority for issuance of such a grant is, first, for K-node peek (read) data; second, for the adaptive execution unit 840 output data; third, for source DMA data; and fourth, for hardware task manager 810 message data. The output pipeline register 855 is available when it is empty or when its contents will be transferred to another register at the end of the current clock cycle.

The DMA engine 830 of the node 800 is an optional component. In general, the DMA engine 830 will follow a five register model, providing a starting address register, an address stride register, a transfer count register, a duty cycle register, and a control register. The control register within the DMA engine 830 utilizes a GO bit, a target node number and/or port number, and a DONE protocol. The K-node 925 writes the registers, sets the GO bit, and receives a DONE message when the data transfer is complete. The DMA engine 830 facilitates block moves from any of the memories of the node 800 to another memory, such as an on-chip bulk memory, external SDRAM memory, another node's memory, or a K-node memory for diagnostics and/or operational purposes. The DMA engine 830, in general, is controlled by the K-node 925.

The hardware task manager 810 is configured and controlled by the K-node 925 and interfaces to all node components except the DMA engine 830. The hardware task manager 810 executes on each node 800, processing a task list and producing a task ready-to-run queue implemented as a first in-first out (FIFO) memory. The hardware task manager 810 has a top level finite state machine that interfaces with a number of subordinate finite state machines that control the individual hardware task manager components. The hardware task manager 810 controls the configuration and reconfiguration of the computational elements 250 within the adaptive execution unit 840 for the execution of any given task by the adaptive execution unit 840.

The K-node 925 initializes the hardware task manager 810 and provides it with set up information for the tasks needed for a given operating mode, such as operating as a communication processor or an MP3 player. The K-node 925 provides configuration information as a stored (task) program within memory 845 and within local memory within the adaptive execution unit 840. The K-node 925 initializes the hardware task manager 810 (as a parameter table) with designations of input ports, output ports, routing information, the type of operations (tasks) to be executed (e.g., FFT, DCT), and memory pointers. The K-node 925 also initializes the DMA engine 830.

The hardware task manager 810 maintains a port translation table and generates addresses for point-to-point data delivery, mapping input port numbers to a current address of where incoming data should be stored in memory 845. The hardware task manager 810 provides data flow control services, tracking both production and consumption of data, using corresponding production and consumption counters, and thereby determines whether a data buffer is available for a given task. The hardware task manager 810 maintains a state table for tasks and, in the selected embodiment, for up to 32 tasks. The state table includes a GO bit (which is enabled or not enabled (suspended) by the K-node 925), a state bit for the task (idle, ready-to-run, run (running)), an input port count, and an output port count (for tracking input data and output data). In the selected embodiment, up to 32 tasks may be enabled at a given time. For a given enabled task, if its state is idle, and if sufficient input data (at the input ports) are available and sufficient output ports are available for output data, its state is changed to ready-to-run and queued for running (transferred into a ready-to-run FIFO or queue). Typically, the adaptive execution unit 840 is provided with configuration information (or code) and two data operands (x and y).

From the ready-to-run queue, the task is transferred to an active task queue, the adaptive execution unit 840 is configured for the task (set up), the task is executed by the adaptive execution unit 840, and output data is provided to the data aggregator and selector 850. Following this execution, the adaptive execution unit 840 provides an acknowledgement message to the hardware task manager 810, requesting the next item. The hardware task manager 810 may then direct the adaptive execution unit 840 to continue to process data with the same configuration in place, or to tear down the current configuration, acknowledge completion of the tear down and request the next task from the ready-to-run queue. Once configured for execution of a selected algorithm, new configuration information is not needed from the hardware task manager 810, and the adaptive execution unit 840 functions effectively like an ASIC, with the limited additional overhead of acknowledgement messaging to the hardware task manager 810. These operations are described in additional detail below.

A module is a self-contained block of code (for execution by a processor) or a hardware-implemented function (embodied as configured computational elements 250), which is processed or performed by an execution unit 840. A task is an instance of a module, and has four states: suspend, idle, ready or run. A task is created by associating the task to a specific module (computational elements 250) on a specific node 800; by associating physical memories and logical input buffers, logical output buffers, logical input ports and logical output ports of the module; and by initializing configuration parameters for the task. A task is formed by the K-node writing the control registers in the node 800 where the task is being created (i.e., enabling the configuration of computational elements 250 to perform the task), and by the K-node writing to the control registers in other nodes, if any, that will be producing data for the task and/or consuming data from the task. These registers are memory mapped into the K-node's address space, and "peek and poke" network services are used to read and write these values. A newly created task starts in the "suspend" state.

Once a task is configured, the K-node can issue a "go" command, setting a bit in a control register in the hardware task manager 810. The action of this command is to move the task from the "suspend" state to the "idle" state. When the task is "idle" and all its input buffers and output buffers are available, the task is added to the "ready-to-run" queue which is implemented as a FIFO; and the task state is changed to "ready/run". Buffers are available to the task when subsequent task execution will not consume more data than is present in its input buffers or will not produce more data than there is capacity in its output buffers.

When the adaptive execution unit 840 is not busy and the FIFO is not empty, the task number for the next task that is ready to execute is removed from the FIFO, and the state of this task is "run". In the "run" state, the task (executed by the configured adaptive execution unit 840) consumes data from its input buffers and produces data for its output buffers.

The adaptive execution units 840 will vary depending upon the type of node 800 implemented. Various adaptive execution units 840 may be specifically designed and implemented for use in heterogeneous nodes 800, for example, for a programmable RISC processing node; for a programmable DSP node; for an adaptive or reconfigurable node for a particular domain, such as an arithmetic node; and for an adaptive bit-manipulation unit (RBU). Various adaptive execution units 840 are discussed in greater detail below.

For example, a node 800, through its execution unit 840, will perform an entire algorithmic element in a comparatively few clock cycles, such as one or two clock cycles, compared to performing a long sequence of separate operations, loads/stores, memory fetches, and so on, over many hundreds or thousands of clock cycles, to eventually achieve the same end result. Through its computational elements 250, the execution unit 840 may then be reconfigured to perform another, different algorithmic element. These algorithmic elements are selected from a plurality of algorithmic elements comprising, for example: a radix-2 Fast Fourier Transformation (FFT), a radix-4 Fast Fourier Transformation (FFT), a radix-2 Inverse Fast Fourier Transformation (IFFT), a radix-4 Inverse Fast Fourier Transformation (IFFT), a one-dimensional Discrete Cosine Transformation (DCT), a multi-dimensional Discrete Cosine Transformation (DCT), finite impulse response (FIR) filtering, convolutional encoding, scrambling, puncturing, interleaving, modulation mapping, Golay correlation, OVSF code generation, Haddamard Transformation, Turbo Decoding, bit correlation, Griffiths LMS algorithm, variable length encoding, uplink scrambling code generation, downlink scrambling code generation, downlink despreading, uplink spreading, uplink concatenation, Viterbi encoding, Viterbi decoding, cyclic redundancy coding (CRC), complex multiplication, data compression, motion compensation, channel searching, channel acquisition, and multipath correlation.

In an exemplary embodiment, a plurality of different nodes 800 are created, by varying the type and amount of computational elements 250 (forming computational units 200), and varying the type, amount and location of interconnect (with switching or routing elements) which form the execution unit 840 of each such node 800. In the exemplary embodiment, two different nodes 800 perform, generally, arithmetic or mathematical algorithms, and are referred to as adaptive (or reconfigurable) arithmetic nodes (AN), as AN1 and AN2. For example, the AN1 node, as a first node 800 of the plurality of heterogeneous and reconfigurable nodes, comprises a first selection of computational elements 250 from the plurality of heterogeneous computational elements to form a first reconfigurable arithmetic node for performance of Fast Fourier Transformation (FFT) and Discrete Cosine Transformation (DCT). Continuing with the example, the AN2 node, as a second node 800 of the plurality of heterogeneous and reconfigurable nodes, comprises a second selection of computational elements 250 from the plurality of heterogeneous computational elements to form a second reconfigurable arithmetic node, the second selection different than the first selection, for performance of at least two of the following algorithmic elements: multi-dimensional Discrete Cosine Transformation (DCT), finite impulse response (FIR) filtering, OVSF code generation, Haddamard Transformation, bit-wise WCDMA Turbo interleaving, WCDMA uplink concatenation, WCDMA uplink repeating, and WCDMA uplink real spreading and gain scaling.

Also in the exemplary embodiment, a plurality of other types of nodes 800 are defined, such as, for example:

A bit manipulation node, as a third node of the plurality of heterogeneous and reconfigurable nodes, comprising a third selection of computational elements 250 from the plurality of heterogeneous computational elements, the third selection different than the first selection, for performance of at least two of the following algorithmic elements: variable and multiple rate convolutional encoding, scrambling code generation, puncturing, interleaving, modulation mapping, complex multiplication, Viterbi algorithm, Turbo encoding, Turbo decoding, correlation, linear feedback shifting, downlink despreading, uplink spreading, CRC encoding, de-puncturing, and de-repeating.

A reconfigurable filter node, as a fourth node of the plurality of heterogeneous and reconfigurable nodes, comprising a fourth selection of computational elements 250 from the plurality of heterogeneous computational elements, the fourth selection different than the first selection, for performance of at least two of the following algorithmic elements: adaptive finite impulse response (FIR) filtering, Griffith's LMS algorithm, and RRC filtering.

A reconfigurable finite state machine node, as a fifth node of the plurality of heterogeneous and reconfigurable nodes, comprising a fifth selection of computational elements 250 from the plurality of heterogeneous computational elements, the fifth selection different than the first selection, for performance of at least two of the following processes: control processing; routing data and control information between and among the plurality of heterogeneous computational elements 250; directing and scheduling the configuration of the plurality of heterogeneous computational elements for performance of a first algorithmic element and the reconfiguration of the plurality of heterogeneous computational elements for performance of a second algorithmic element; timing and scheduling the configuration and reconfiguration of the plurality of heterogeneous computational elements with corresponding data; controlling power distribution to the plurality of heterogeneous computational elements and the interconnection network; and selecting the first configuration information and the second configuration information from a singular bit stream comprising data commingled with a plurality of configuration information.

A reconfigurable multimedia node, as a sixth node of the plurality of heterogeneous and reconfigurable nodes, comprising a sixth selection of computational elements 250 from the plurality of heterogeneous computational elements, the sixth selection different than the first selection, for performance of at least two of the following algorithmic elements: radix-4 Fast Fourier Transformation (FFT); multi-dimensional radix-2 Discrete Cosine Transformation (DCT); Golay correlation; adaptive finite impulse response (FIR) filtering; Griffith's LMS algorithm; and RRC filtering.

A reconfigurable hybrid node, as a seventh node of the plurality of heterogeneous and reconfigurable nodes, comprising a seventh selection of computational elements 250 from the plurality of heterogeneous computational elements, the seventh selection different than the first selection, for performance of arithmetic functions and bit manipulation functions.

A reconfigurable input and output (I/O) node, as an eighth node of the plurality of heterogeneous and reconfigurable nodes, comprising an eighth selection of computational elements 250 from the plurality of heterogeneous computational elements, the eighth selection different than the first selection, for adaptation of input and output functionality for a plurality of types of I/O standards, the plurality of types of I/O standards comprising standards for at least two of the following: PCI busses, Universal Serial Bus types one and two (USB1 and USB2), and small computer systems interface (SCSI).

A reconfigurable operating system node, as a ninth node of the plurality of heterogeneous and reconfigurable nodes, comprising a ninth selection of computational elements 250 from the plurality of heterogeneous computational elements, the ninth selection different than the first selection, for storing and executing a selected operating system of a plurality of operating systems.

Figure 15:
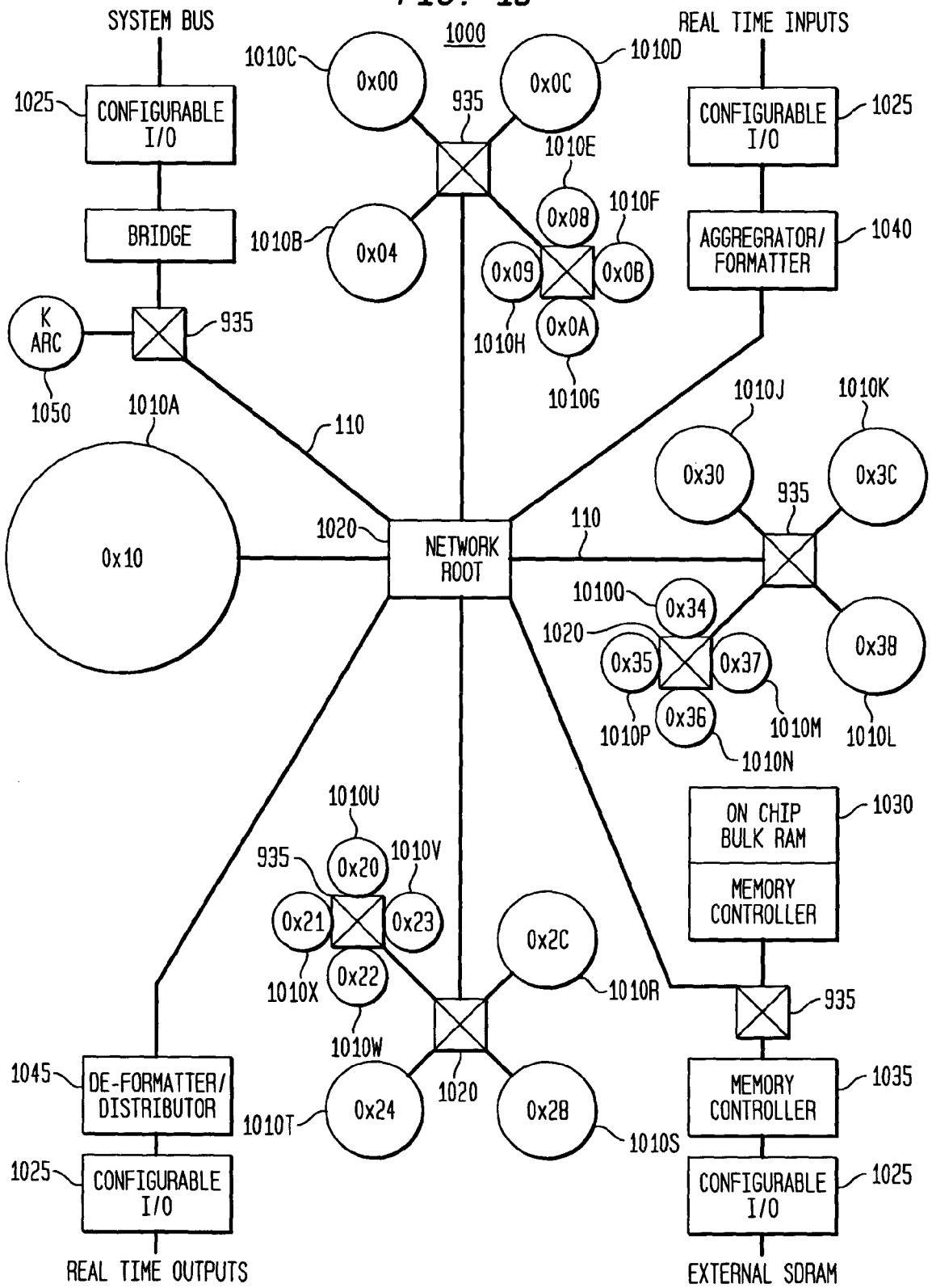
FIG. 15 is a block diagram illustrating an exemplary second system embodiment 1000 in accordance with the present invention.

FIG. 15 is a block diagram illustrating a second system embodiment 1000 in accordance with the present invention. The second system embodiment 1000 is comprised of a plurality of variably-sized nodes (or matrices) 1010 (illustrated as nodes 1010A through 1010X), with the illustrated size of a given node 1010 also indicative of an amount of computational elements 250 within the node 1010 and an amount of memory included within the node 1010 itself. The nodes 1010 are coupled to an interconnect network 110, for configuration, reconfiguration, routing, and so on, as discussed above. The second system embodiment 1000 illustrates node 800 and system configurations which are different and more varied than the quadrant 930 and quad 940 configurations discussed above.

As illustrated, the second system embodiment 1000 is designed for use with other circuits within a larger system and, as a consequence, includes configurable input/output (I/O) circuits 1025, comprised of a plurality of heterogeneous computational elements configurable (through corresponding interconnect, not separately illustrated) for I/O functionality. The configurable input/output (I/O) circuits 1025 provide connectivity to and communication with a system bus (external), external SDRAM, and provide for real time inputs and outputs. A K-node (KARC) 1050 provides the K-node (KARC) functionality discussed above. The second system embodiment 1000 further includes memory 1030 (as on-chip RAM, with a memory controller), and a memory controller 1035 (for use with the external memory (SDRAM)). Also included in the apparatus 1000 are an aggregator/formatter 1040 and a de-formator/distributor 1045, providing functions corresponding to the functions of the data aggregator and selector 850 and data distributor and decoder 820, respectively, but for the larger system 1000 (rather than within a node 800).

As indicated above, the reconfigurable nodes 800 (and any other matrices 150) implement a data flow model and are designed for tasks to run in the adaptive execution unit

840, from start to finish, as long as they have operand data in input buffers (such as pipeline register 815) and have availability for output data in output buffers (such as pipeline register 855). The adaptive execution unit 840, and the tasks to be executed by the adaptive execution unit 840, however, may be designed to lack separate intelligence concerning when to start or stop processing data, as in general such data processing may not be a continuous operation. More particularly, the data processing demands of a node 800 may involve multiple and different tasks which start and stop processing at or during a wide variety of time intervals. For example, a first task may occur regularly (periodically), processing data at regular intervals. While this first task is quiescent and not processing data, a second task may be enabled within the adaptive execution unit 840 to process the then current incoming data. Processing tasks may also be irregular or dynamically determined, with processing needed at variable times and for variable durations. In other instances, data processing may be a one-time operation, may be a continuous operation (when the device is on and operative), may process only a certain amount of consecutive input data, may process all but a certain amount of consecutive input data, may start processing input data at a particular point in time or at a particular point in a data stream, or may process all input data until a particular point in time or a particular point in the data flow. For example, a regular (or normal) task may be stopped, with an exception (or non-regular) task initiated as needed, followed by resumption of the normal task.

As a consequence, any given task for execution within an adaptive execution unit 840 needs to know if and when it needs to process incoming data, for how long it needs to process incoming data, and needs to do this in conjunction with other tasks which need to be executing in the adaptive execution unit 840 at certain points in time or certain points in a data stream. For example, for CDMA applications (such as WCDMA or cdma2000 applications):

(1) for power control, a task will be invoked periodically to process a certain amount of data (64 chips);

(2) for channel estimation, a task needs to run irregularly, when pilot symbols are received;

(3) for channel searching, a rake finger task may be dynamically assigned and reassigned for data processing with an activity or execution time dynamically determined by the searcher;

(4) searching tasks may operate for a predetermined amount of time or predetermined amount of data and cease;

(5) in a compressed mode, WCDMA demodulation tasks may operate virtually continuously, until a GSM search window arrives, then cease while GSM search tasks are running, and then resume;

(6) for pseudo-noise sequence generation in cdma2000, a zero is artificially inserted at the end of the period of the linear feedback shift register (LFSR) sequences before repeating the sequence, while in WCDMA, LFSRs have to be prematurely reset.

As a consequence, an adaptive execution unit 840 needs to know what tasks should be executing, when, and for what duration (or for what amount of data is to be consumed during such execution). In accordance with the present invention, such determinations, and corresponding control, are implemented based upon the amount of data consumed during execution of a task (or, equivalently, the amount of data transferred while waiting for a task to begin). This amount of data, measured herein in units of "buffers" or "data buffers", may be correlated with any time or duration measurements, determined either in advance of task execution or dynamically during task execution. For example, 64 chips in cdma2000 may correspond to one or two data buffer units, depending upon a designer's selections or specifications.

In the selected embodiments, this amount of data is measured using units corresponding to the amount of data in a full buffer, such as a full input pipeline register 815. As input data in input pipeline register 815 is consumed, in one clock cycle, that amount of data corresponds to and is measured as one "buffer". As more data fills the input pipeline register 815 in the next cycle and is consumed, that amount of data will be counted as a second buffer, followed by a third buffer, and so on. The actual amount of data (number of bytes) within any given (full) buffer, as a data unit, may be determined in the specification or design of a given application or task or by any given application or task.

Similarly, the point in a data stream (or, equivalently, point in time) at which a particular task should start or stop is referred to herein as a boundary condition. In accordance with the present invention, such a boundary condition (or boundary) is detected based upon a predetermined or dynamically determined amount of data which has been consumed by a given task (or the amount of data transferred while waiting for a task to begin). For example, in accordance with the present invention, when such a (first) boundary condition (or boundary) is detected, a selected task will be initiated and will operate until a certain or determined amount of data has been consumed or transferred, measured in data buffer units, which corresponds to the occurrence of a next (or second) boundary condition requiring the performance of a different task or the cessation of the current task. The control flow of the present invention, as a consequence, detects when a task needs to start or stop based upon the number of buffers of data consumed or transferred, with a first task commencing and operating until a first amount of data buffers are consumed or transferred, while a second task then commences and operates until a second amount of data buffers are consumed or transferred, and so on. When a predetermined or dynamically determined amount of data has been consumed or transferred, corresponding to a boundary condition, such as the first amount of data or second amount of data, the invention then provides for a determination of the next action of the adaptive execution unit 840, such as stopping the current task, stopping the current task and commencing with a next task, stopping the current task and resuming a previous task, and so on. This predetermined or dynamically determined amount of data, used to measure or detect the occurrence of a boundary condition, is referred to herein as a "buffer parameter", and may be one of many metrics or parameters utilized in performance of a given task, which are generally referred to as "task parameters".

Figure 16:
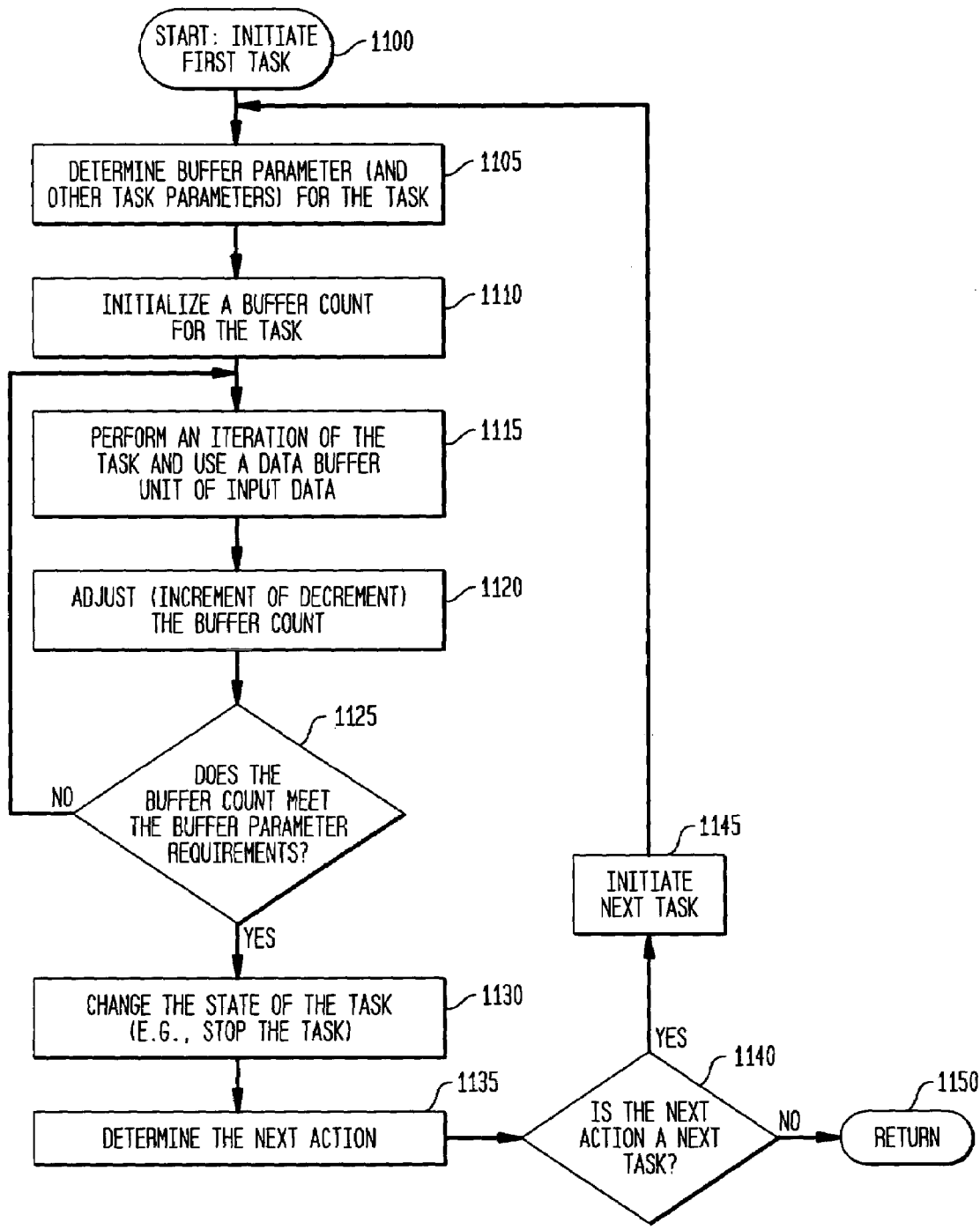
FIG. 16 is a flow diagram illustrating the control flow methodology of the present invention.

FIG. 16 is a flow diagram illustrating the control flow methodology of the present invention. As discussed in greater detail below, this methodology may be implemented in one or more of the various nodes 800 (or ACE 100) in a wide variety of ways. The method begins, start step 1100, when a task is initiated for execution (or while waiting for a task to begin). Parameters for the task are then determined, step 1105, such as determination of a buffer parameter for the initiated task (number of data buffer units to be consumed by the task, at which point the task will be stopped, or the number of data buffer units to be transferred to the node before the task will commence). Next, the method determines or initializes a data buffer count for the task (or waiting period), such as by setting a counter to zero (for incremental counting up to the buffer parameter), or by setting the buffer count to the buffer parameter count (for decremental counting to zero). The task then operates and consumes a buffer of data, step 1115, and may also generate messages, depending upon the selected embodiment, as discussed below (or, equivalently, if waiting for a task to begin at a boundary, a buffer of data is transferred). Next, having consumed or transferred a data buffer unit, the data buffer count is adjusted, such as by incrementing or decrementing the data buffer count, step 1120. The method then determines whether the current data buffer count has met the level of the data buffer parameter, step 1125. For example, if a buffer count was initialized to zero and has now been incremented to equal the data buffer parameter, or if the data buffer count was initialized to the data buffer parameter and has decremented to zero, then the buffer parameter requirements have been met and the method proceeds to step 1130. When these requirements have not been met in step 1125, the method returns to step 1115 and continues to consume or transfer data until the buffer parameter requirements or conditions have been met.

When the buffer parameter conditions have been met in step 1125, the task changes state, such as by ceasing, step 1130, and a next action is determined, step 1135. For example, a first task may stop in step 1130, and a second task is determined (as a next action) in step 1135. In other circumstances, a first task may stop in step 1130, while no second task is determined (as a next action) in step 1135 (i.e., the first task is stopped and the adaptive execution unit 840 is quiescent or idle until another boundary condition occurs, such as for resumption of the first task or initiation of another task, or idle until another event of some kind occurs for the ACE 100). As indicated above, step 1130 may also involve the end of a waiting interval (such a waiting interval may itself be defined as a task in a selected embodiment of the invention). When this next action is a task in step 1140, this next or second task is initiated, step 1145, and the method returns to step 1105 for the task to run until the occurrence of a next boundary condition (with corresponding buffer and other task parameters). This next task will operate until its buffer parameter conditions have been met, at which point it will also change states and a next action will be determined. When there is no next task to be performed in step 1140, the method may end, return step 1150.

There are several different ACE 100 embodiments which may implement the control flow methodology illustrated in FIG. 16, as a "control task", discussed below with reference to FIGS. 17-21. Generally, each of these various embodiments will determine a boundary condition, namely, the point in a data stream (which may also be correlated with time or with clock cycles, equivalently) at which one task may cease and a second task begin, by counting the number of data buffers consumed or transferred. These various tasks which consume or produce data are illustrated and referred to as "data tasks" or "run tasks". Next, each of these embodiments will determine the next action to be taken upon detection of a boundary condition. Various exemplary embodiments include use of a programmable node 800 to manage and provide control flow for another, given node 800, such as a reconfigurable node (FIGS. 17 and 18); use of another, second task within the given node 800 to provide control flow for other tasks within the given node 800 (FIG. 19); use of the hardware task manager 810 within the given node 800 to provide control flow for all tasks within that given node 800 (FIG. 20); and use of a node sequencer within the adaptive execution unit 840 of the given node 800 to provide control flow for all tasks within that given node 800 (FIG. 21). Each of these embodiments is discussed in greater detail below.

As indicated above, buffer (or task) parameters must be determined for each task that will run on an adaptive execution unit 840. In many instances, these task parameters may be determinable in advance, while in other circumstances the task parameters may change and therefore are determined dynamically. In other circumstances, data processing may also begin or end non-incrementally, namely, at a byte or bit within a data buffer (i.e., a non-integer multiple of a data buffer unit). These task parameters may be determined in advance, or may be dynamically determined, such as based upon information sent to an node 800 from an external source, from another node 800, or from another task within the node 800.

Figure 17:
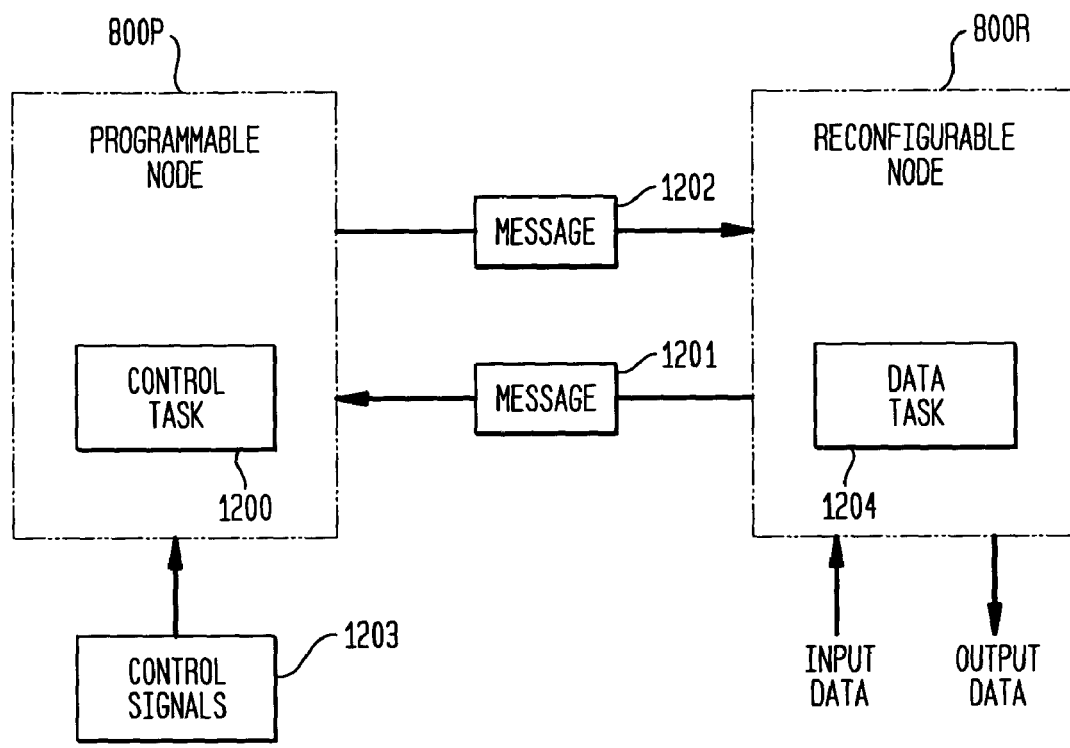
FIG. 17 is a block diagram illustrating a first embodiment of the control flow methodology of the present invention.

FIG. 17 is a block diagram illustrating a first embodiment 1205 of the control flow methodology of the present invention. In the first embodiment 1205, a programmable node 800P is utilized to provide control flow to another node 800, such as a reconfigurable node 800R. Such a programmable node is programmed, as control task 1200: (1) to determine or obtain the buffer parameter and any other applicable task parameters (step 1105), such as from one or more control signals from an external source; (2) to maintain a buffer counter (step 1110) and to adjust the buffer count (step 1120); and (3) when it detects a boundary condition based upon the buffer parameter (step 1125), to change the state of (or stop) the current data task (step 1130) and determine the next action or task (steps 1135 and 1140); and (4) initiate any next task (step 1145) and repeat the process. The occurrence of boundary conditions may be determined using any conditional or if statements (e.g., if-then-else) as known in the art. As the data task 1204 is operating and consuming data however, such as in step 1115, the programmable node 800P must be informed of the data buffers being passed to the reconfigurable node 800R executing the data task (or waiting to begin a task), illustrated as one or more messages or signals 1201. For example, the data task (or another entity within one of the nodes 800 or ACE 100) may signal or provide a message to the programmable node 800, indicating consumption or transfer of a data buffer, for the programmable node to correspondingly adjust its data buffer count for that task in step 1120. Similarly, when the boundary conditions have occurred, the programmable node must signal or provide a message to the current task to stop (or provide a message with sufficient information for the reconfigurable node to stop the current task) (step 1130), and signal or provide a message to the next task to start (or provide a message with sufficient information for the reconfigurable node to start the next task) (step 1145), and so on, as the methodology repeats for each next task, illustrated as one or more messages or signals 1202.

Continuing to refer to FIG. 17, the input data is provided directly to the reconfigurable node 800R performing the data task 1204, and the output data is provided directly from the reconfigurable node 800R performing the data task 1204. As a consequence, additional routing of input and output data is not required in this first embodiment 1205. An advantage of this first embodiment 1205 is significant flexibility in monitoring any type of boundary condition, without burdening the reconfigurable node which is executing one or more tasks. In addition, the programmable node may also be the entity within the ACE 100 which provides or decides dynamic task parameters, including buffer parameters, so that additional signaling may not be required to change or modify these values. Conversely, via the various MIN levels, messaging to start and stop tasks is required, which should also be timed or synchronized appropriately with each such task. (Such required synchronization of control signals with real time data may or may not be desirable for various applications).

Figure 18:
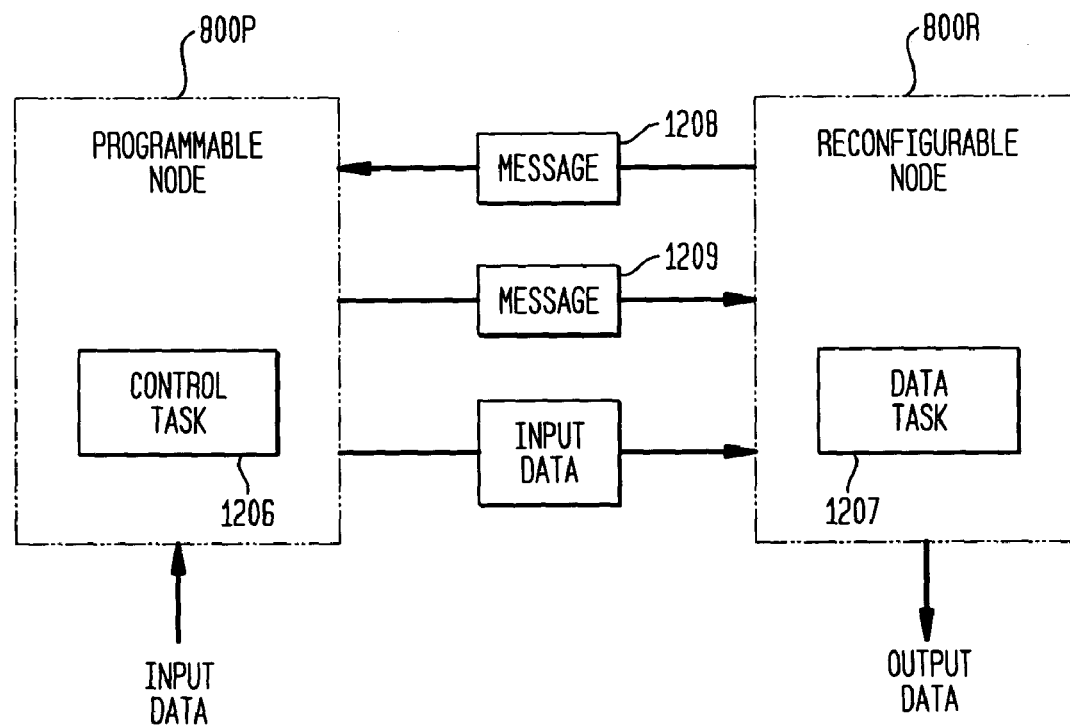
FIG. 18 is a block diagram illustrating a variation of the first embodiment of the control flow methodology of the present invention.

FIG. 18 is a block diagram illustrating a variation of the first embodiment 1210 of the control flow methodology of the present invention. In this variation, the input data is provided directly to the programmable node 800P which, in turn, performing the control task 1206, determines whether to provide this input data to the reconfigurable node 800R performing the data task 1207. Rather than the programmable node 800P providing control messaging 1202 to the reconfigurable node 800R, in this variation, the data task 1207 is triggered to begin by the arrival of the input data transferred from the programmable node 800P. In this variation, the output data is provided directly from the reconfigurable node 800R performing the data task 1207. Messaging 1208 to the programmable node 800P from the reconfigurable node 800R, concerning consumption of data, may be optional in this variation (as the programmable node 800P may assume instead that the data task 1207 has been properly performed). Messaging 1209 from the reconfigurable node 800R to the programmable node 800P, in this embodiment, is generally not control information (to start a task), and is instead other types of information or parameters, such as filter coefficients, for example.

Figure 19:
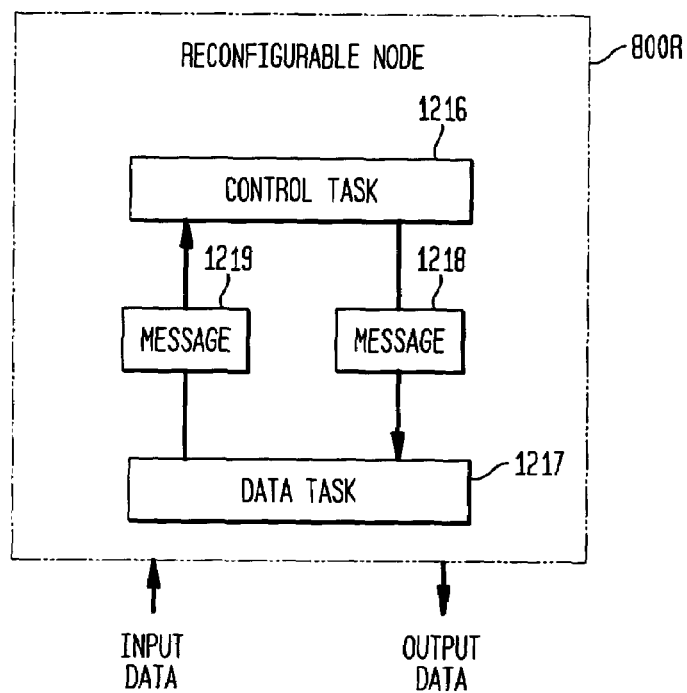
FIG. 19 is a block diagram illustrating a second embodiment of the control flow methodology of the present invention.

FIG. 19 is a block diagram illustrating a second embodiment 1215 of the control flow methodology of the present invention. In this second embodiment 1215, a separate or second control (monitoring) task 1216 within the reconfigurable node 800R operates in tandem with each given data task 1217 (serially) to provide control flow for these data tasks within the given node 800, such as the reconfigurable node 800R. (Equivalently, the control task may be added as micro-code to every data task to run as part of that data task). This control or monitoring task 1216 determines or obtains the buffer parameter and any other applicable task parameters (step 1105) and maintains a buffer counter (step 1110). After the given data task 1217 executes, the control task 1216 executes, counts the data buffers consumed (step 1120), and checks the boundary conditions (step 1125). When the control task 1216 detects a boundary condition based upon the buffer parameter (step 1125), it changes the state of (or stops) the current data task 1217 (step 1130), determines the next action or task (steps 1135 and 1140), and provides signaling or messaging 1218 within the node 800 to stop or start a given task (e.g., step 1145). Similarly, when the data task 1217 receives input data, it provides a message 1219 to the control task 1216. This messaging 1218 and 1219 between the data task 1217 and the control task 1216, for example, may be setting or clearing a flag in a shared memory. This second embodiment has the advantage of no longer taxing the MIN and programmable node 800P with signaling requirements, but may add latency to the execution time of normal or regular tasks (which may further require increasing the number of nodes 800 or the processing clock speed to implement a particular application).

Figure 20:
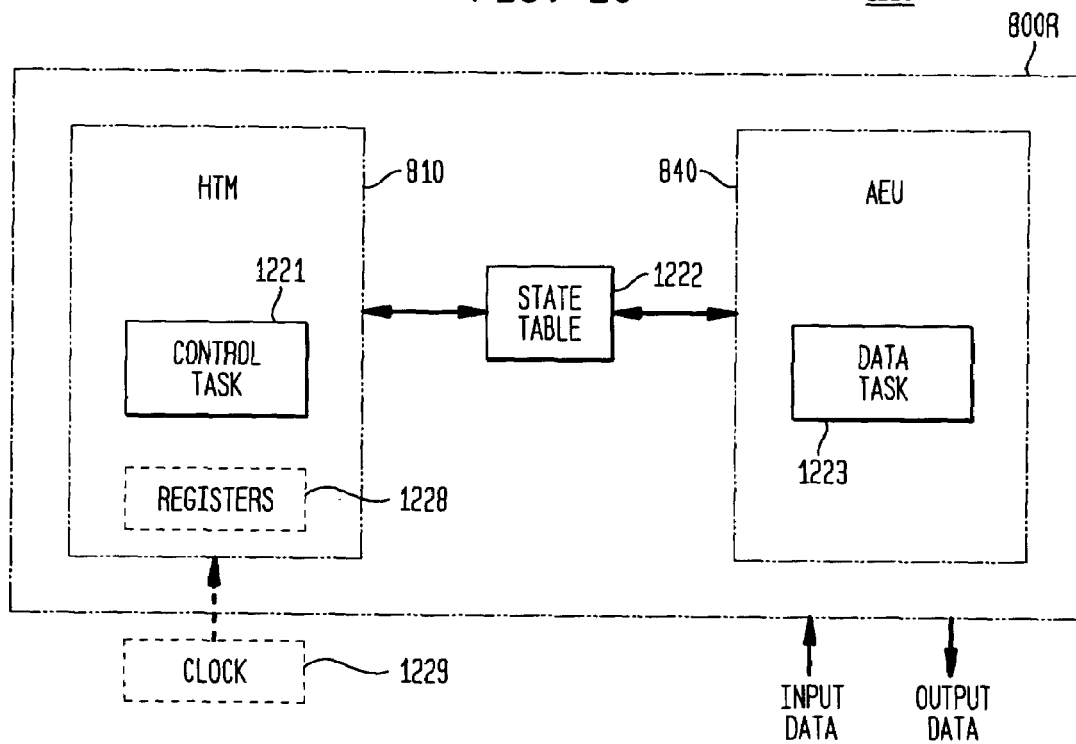
FIG. 20 is a block diagram illustrating a third embodiment of the control flow methodology of the present invention.
Figure 21:
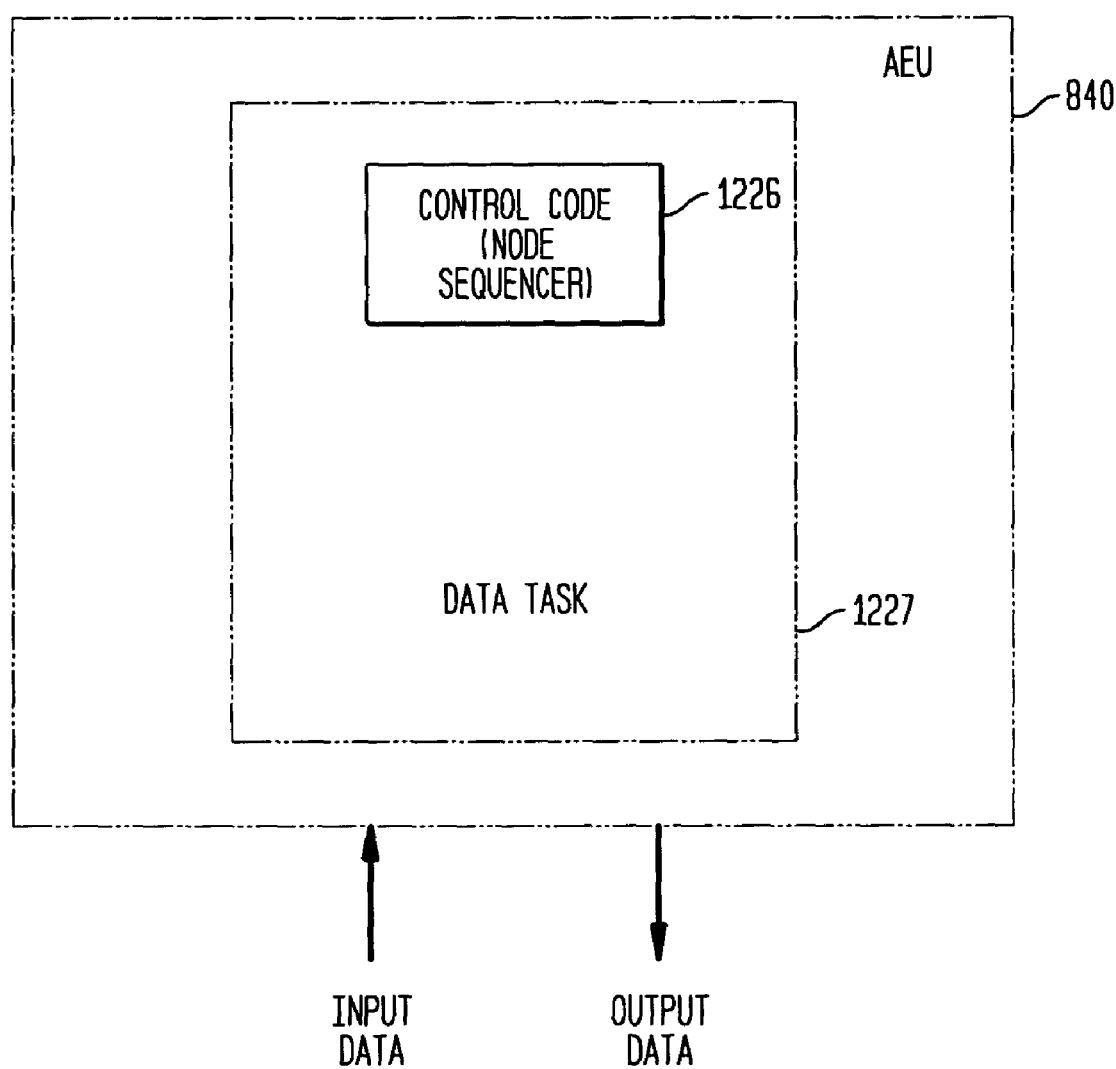
FIG. 21 is a block diagram illustrating a fourth embodiment of the control flow methodology of the present invention.

FIG. 20 is a block diagram illustrating a third embodiment 1220 of the control flow methodology of the present invention. In the third embodiment 1220, the hardware task manager 810 of the node 800 performs the control task 1221, monitoring each task and providing control flow for each data task to be performed by the adaptive execution unit ("AEU") 840 within that given node 800, such as a reconfigurable node 800R. More particularly, the hardware task manager 810 may invoke a data task 1223 and place it in the ready-to-run queue (as discussed above with reference to FIG. 10), determine or obtain the buffer parameter and any other applicable task parameters (step 1105), and maintain a buffer counter (step 1110). As the task 1223 executes (step 1115), the hardware task manager 810 will count the number of buffers consumed by the task (step 1120) (or transferred), and when the boundary conditions have been met (step 1125), will disable the task (step 1130) (by not including it in the ready-to-run queue until it is time for it to resume or restart) and invoke a next data task (steps 1135 and 1145) (by placing it in the ready-to-run queue), or will otherwise follow the boundary processing included in the micro-code of the given task, with the process continuing or repeating as various tasks are executed. In this embodiment 1220, the task (including buffer) parameters may be determined as part of the task description, and the task description may also include the next action to be taken following the occurrence of the boundary condition. Task parameters may also be provided dynamically by other tasks, other nodes, or from external sources.

Also in this third embodiment 1220, the hardware task manager 810 may communicate with the adaptive execution unit 840, to start or stop a given data task, through the state table (shared memory) 1222, as discussed above with reference to FIG. 10 (providing that the selected data task is ready-to-run and queued to run). In this third embodiment 1220, the control task of the hardware task manager 810 is triggered or started upon the occurrence of either all data inputs having arrived (an AND condition for all data inputs), or at least one control signal having been received by the hardware task manager 810 (an OR condition for all control inputs or signals).

For selected implementations using this embodiment, in lieu of the hardware task manager 810 directly counting the number of data buffers consumed or transferred, as an equivalent implementation, the number of data buffers also may be correlated with system clock cycles, with boundary conditions, counts and other data parameters also correlated by system clock cycles. As illustrated in FIG. 20, the various system clock cycle counts (from system clock 1129) may be stored in registers 1228 within the hardware task manager 810. This alternative embodiment functions as discussed above, but with counts and parameters determined and measured using system clock cycles which have been correlated with data buffer units, e.g., triggering a state change in step 1125 based on a clock cycle count of 1000 cycles=5 data buffer units, with a correlation of one data buffer unit per 200 clock cycles.

This third embodiment has distinct advantages. As the hardware task manager 810 initiates all tasks for the adaptive execution unit 840, monitoring when the task is to be started or stopped should also be part of the hardware task manager 810 functions, and does not require any messaging or additional signaling (other than for dynamically changing task parameters). As this monitoring occurs in parallel with task execution, the monitoring does not involve any additional processing latency.

FIG. 21 is a block diagram illustrating a fourth embodiment 1225 of the control flow methodology of the present invention. In this fourth embodiment 1225, a programmable "node sequencer" 1226 which performs the control task is utilized within the adaptive execution unit 840 to monitor each data task 1227 and provide control flow for each data task 1227 within that given node 800. In this embodiment, the control task (of or comprising the node sequencer 1226) is embedded within every data task 1227, such that every data task 1227 includes control code (as the control task)

which is run on the node sequencer 1226 of the adaptive execution unit 840. The operation of the node sequencer 1226 precedes or follows each data task iteration (and may be viewed as an instruction processing, hardware embodiment of the control task, providing a hardware embodiment to perform the conditional, if-then-else logic of the control task). For example, each data task 1227 within the adaptive execution unit 840 which requires boundary monitoring is augmented by control code (as the control task) which is performed by the operation of a node sequencer 1226, which will also operate whenever the task is initiated by the hardware task manager 810. As a consequence, as the data task 1227 runs, the node sequencer 1226 performing the control task determines or obtains the buffer parameter and any other applicable task parameters (step 1105), such as by copying task parameters to a shared memory location or interface with the data task 1227; maintains a buffer counter (step 1110) and adjusts the buffer count as data buffers are consumed or transferred (step 1120); checks the boundary conditions (step 1125); continues with the task when the boundary condition has not occurred (step 1125); and provides for conditional branching (decisions) upon the occurrence of the boundary condition (in step 1125), including stopping the current task (step 1130), determining the next task (step 1135) and invoking the next task (step 1145). In this embodiment, an exception task also may be provided as part of the node sequencer operation, or may be implemented separately.

This fourth embodiment has various advantages, such as providing for potentially complicated boundary monitoring, without messaging requirements, and seamless transitions from normal to exception processing (and vice-versa). This fourth embodiment, however, may involve some processing latency for each task, but does not require the hardware task manager 810 to provide control flow.

It should be noted that any given implementation of the invention may be a hybrid, mix or other combination of the various embodiments discussed above. For example, the programmable node embodiment discussed with reference to FIG. 17, providing messaging to control a task within a reconfigurable node, such as by setting task parameters, may be combined with other parts of the control methodology within the reconfigurable node, such as that discussed with reference to FIGS. 19, 20 and 21, such as for counting and determinations of the occurrence of boundary conditions.

As indicated above, upon the occurrence of a boundary condition (i.e., boundary detection), different activities may follow. For example, another task may not be determined and initiated, in which case processing activities may cease until the occurrence of another event or condition of some kind. In other circumstances, a given task may stop, wait for a number of data buffers, and then resume. In other instances, an executing first task may stop, another second task may start, execute for a number of data buffers and stop, followed by resumption of the first task. Other equivalent permutations, combinations and variations will also be apparent to those of skill in the art, and are included within the scope of the present invention.

Numerous advantages of the present invention may be apparent to those of skill in the art. The present invention provides the ability to implement and control execution of algorithms in an adaptive computing environment based on a data flow processing model. The present invention provides control over when processing of input data should begin for a given task or operation, when processing of input data should end for the given task or operation, and controls how these determinations are made. In addition, the present invention provides for control over processing of multiple tasks or operations. As discussed in greater detail below, the present invention also provides for a plurality of implementations of a control flow methodology in the ACE architecture, including within a programmable node, a monitoring task, a hardware task manager, and a nodal sequencer.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. An apparatus for providing data flow control in an adaptive computing circuit, the apparatus comprising:
    a reconfigurable node capable of executing a first task and a second task of a plurality of tasks the reconfigurable node comprising:
        a wrapper having a hardware task manager; and
        an adaptive execution unit coupled to the wrapper, the adaptive execution unit comprising:
            a plurality of computational elements, wherein a first computational element of the plurality of computational elements has a first fixed architecture and a second computational element of the plurality of computational elements has a second fixed architecture, the first fixed architecture being different from the second fixed architecture;
            a plurality of switching elements coupled to the plurality of computational elements, the plurality of switching elements capable of configuring the plurality of computational elements for performance of the first task in response to first configuration information, and the plurality of switching elements further capable of reconfiguring the plurality of computational elements for performance of the second task in response to second configuration information, the first task being different than the second task;
        the hardware task manager and the adaptive execution unit communicating through a shared memory to track states of the first and second tasks and to define the configuration of the computational elements; and
    a programmable node coupled to the reconfigurable node, the programmable node capable of initiating the first task, determining a buffer parameter defining the number of buffers to be consumed in execution of the first task; initializing a buffer count for the first task; for each iteration of the first task by the reconfigurable node using a data buffer unit of the number of buffers of input data, correspondingly adjusting a buffer count; and when the buffer count meets the buffer parameter requirements, changing a state of the first task and initiating the second task utilizing a new buffer parameter.

2. The apparatus of claim 1 wherein the reconfigurable node is further capable of providing a message to the programmable node, the message indicating use of a data buffer unit of input data, for each iteration of the first task by the reconfigurable node.

3. The apparatus of claim 1 wherein the programmable node is further capable of providing a message to the reconfigurable node, the message indicating the change of state of the first task.

4. The apparatus of claim 1 wherein the programmable node is further capable of providing a message to the reconfigurable node, the message indicating the initiation of the second task as the next action.

5. The apparatus of claim 4, wherein the programmable node is further capable of signaling the reconfigurable node to stop the second task and resume of execution of the first task.

6. The apparatus of claim 5, wherein when the next action is a second task, the monitoring task is further capable of stopping the first task and initiating the second task.

7. The apparatus of claim 1, wherein when the next action is a second task, the programmable node is further capable signaling the reconfigurable node to stop the first task and initiate the second task.

8. An apparatus comprising: an adaptive execution unit capable of executing a first task and a second task of a plurality of tasks, the adaptive execution unit further capable of executing a monitoring task;
a plurality of computational elements, wherein a first computational element of the plurality of computational elements has a first fixed architecture and a second computational element of the plurality of computational elements has a second fixed architecture, the first fixed architecture being different from the second fixed architecture; and
an interconnection network coupled to the plurality of computational elements, the interconnection network capable of configuring the plurality of computational elements for performance of the first task in response to first configuration information; the interconnection network further capable of reconfiguring the plurality of computational elements for performance of the second task in response to second configuration information, the first task being different than the second task; and the interconnection network further capable of reconfiguring the plurality of compational elements for performance of a monitoring task in response to third configuration information, the monitoring task being different than the first task and the second task; and
a hardware task manager coupled to the adaptive execution unit, the hardware task manager capable of initiating the first task for execution by the adaptive execution unit;
the hardware task manager and the adaptive execution unit communicating through a shared memory to track states of the first and second tasks and to define the configuration of the computational elements;
wherein the hardware task manager is adopted to determine a buffer parameter defining a number of buffers to be consumed in expectation of the first task; initializing a buffer count for the first task; for each iteration of the first task by the adaptive execution unit using a data buffer unit of input data, correspondingly adjusting the buffer count; and when the buffer count meets the buffer parameter requirements, changing a state of the first task initiating each of the second and third tasks utilizing a uniquely determined buffer parameter.

9. The apparatus of claim 8, wherein the monitoring task is further capable of stopping the second task and initiating the resumption of execution of the first task.

10. The apparatus of claim 9, wherein the node sequencer is an instruction processor.

11. The apparatus of claim 10, wherein the node sequencer is further capable of stopping the second task and initiating the resumption of execution of the first task.

12. The apparatus of claim 9, wherein when the next action is a second task, the node sequencer is further capable of stopping the first task and initiating the second task.

13. The apparatus of claim 9, wherein the changing the state of the task by the node sequencer further comprises stopping the execution of the first task.

14. The apparatus of claim 9, wherein the buffer parameter is an integer multiple of the data buffer unit.

15. The apparatus of claim 9, wherein the buffer parameter is a non-integer multiple of the data buffer unit.

16. The apparatus of claim 9, wherein the node sequencer is further capable of initializing the buffer count to equal the buffer parameter; adjusting the buffer count by decrementing from the buffer count; and determining that the buffer count meets the buffer parameter requirements when the buffer count has been decremented to zero.

17. The apparatus of claim 9, wherein the node sequencer is further capable of initializing the buffer count to zero; adjusting the buffer count by incrementing the buffer count; and determining that the buffer count meets the buffer parameter requirements when the buffer count has been incremented to equal the buffer parameter.

18. The apparatus of claim 9, wherein the buffer parameter is determined dynamically by the node sequencer or is a predetermined value.

19. The apparatus of claim 9, wherein the plurality of tasks comprise at least two of the following tasks: power control, channel estimation, rake reception, channel searching, modulation, demodulation, pseudo-noise sequence generation, messaging, signaling, and waiting.

20. An adaptive execution unit comprising:
a plurality of computational elements, wherein a first computational element of the plurality of computational elements has a first fixed architecture and a second computational element of the plurality of computational elements has a second fixed architecture, the first fixed architecture being different from the second fixed architecture;
an interconnection network coupled to the plurality of computational elements, the interconnection network capable of configuring the plurality of computational elements for performance of a first task of a plurality of tasks in response to first configuration information, and the interconnection network further capable of reconfiguring the plurality of computational elements for performance of a second task of the plurality of tasks in response to second configuration information, the first task being different than the second task; and
a node sequencer coupled to the interconnection network, the node sequencer capable of initiating the first task for execution by the adaptive execution unit, determining a buffer parameter defining a number of buffers to be consumed in the execution of the first task; initializing a buffer count for the first task; for each iteration of the first task by the adaptive execution unit using a data buffer unit of the number of buffers of input data, correspondingly adjusting the buffer count; and when the buffer count meets the buffer parameter requirements, changing a state of the first task and initiating the second task utilizing a new buffer parameter corresponding to a number of buffers to be consumed in the second task, wherein a hardware task manager communicates with the adaptive execution unit through a shared memory to track states of the first and second tasks and to define the configuration of the computational elements.

* * * * *

UNITED STATES PATENT AND TRADEMARK OFFICE
CERTIFICATE OF CORRECTION

PATENT NO. : 7,353,516 B2  Page 1 of 1
APPLICATION NO. : 10/641976
DATED : April 1, 2008
INVENTOR(S) : Heidari-Bateni et al.

It is certified that error appears in the above-identified patent and that said Letters Patent is hereby corrected as shown below:

In column 33, line 38, please replace "compational" with --computational--

Signed and Sealed this

Fifth Day of August, 2008

JON W. DUDAS
*Director of the United States Patent and Trademark Office*